US012783880B2

(12) United States Patent
Feng et al.

(10) Patent No.: US 12,783,880 B2
(45) Date of Patent: Nov. 3, 2026

(54) SELECTIVE CLASSIFICATION WITH ALTERNATE SELECTION MECHANISM

(71) Applicant: Royal Bank of Canada, Toronto (CA)

(72) Inventors: Leo Feng, Montreal (CA); Mohamed Osama Ahmed, Vancouver (CA); Hossein Hajimirsadeghi, Vancouver (CA); Amir Abdi, Vancouver (CA)

(73) Assignee: ROYAL BANK OF CANADA, Toronto (CA)

(*) Notice: Subject to any disclaimer, the term of this patent is extended or adjusted under 35 U.S.C. 154(b) by 727 days.

(21) Appl. No.: 18/316,105

(22) Filed: May 11, 2023

(65) Prior Publication Data

US 2023/0368027 A1 Nov. 16, 2023

Related U.S. Application Data

(60) Provisional application No. 63/341,826, filed on May 13, 2022.

(51) Int. Cl.
*G06N 3/08* (2023.01)

(52) U.S. Cl.
CPC ..................................... *G06N 3/08* (2013.01)

(58) Field of Classification Search
CPC ..................................................... G06N 3/082
See application file for complete search history.

(56) References Cited

PUBLICATIONS

Huang, Lang, Chao Zhang, and Hongyang Zhang. "Self-adaptive training: beyond empirical risk minimization." Advances in neural information processing systems 33 (2020): 19365-19376. (Year: 2020).*
Geifman Y, El-Yaniv R. Selectivenet: A deep neural network with an integrated reject option. InInternational conference on machine learning May 24, 2019 (pp. 2151-2159). PMLR. (Year: 2019).*
Robert Baldock et al., Deep learning through the lens of example difficulty, Advances in Neural Information Processing Systems, 34, 2021.
Peter L. Bartlett et al., Classification with a reject option using a hinge loss, J. Mach. Learn. Res., 9:0 1823-1840, Jun. 2008. ISSN 1532-4435.
Lukas Bossard et al., Food-101—mining discriminative components with random forests, European Conference on Computer Vision, 2014.

(Continued)

*Primary Examiner* — Schyler S Sanks

(57) ABSTRACT

A method for preparing a trained complete selective classifier can be applied to a trained complete selective classifier having an existing trained selection mechanism. The trained selective classifier is modified to disregard the existing trained selection mechanism and use, as a basis for an alternate selection mechanism, at least one classification prediction value, for example the predictive entropy or the maximum predictive class logit. Optionally, before modifying the trained selective classifier, the method commences with an untrained selective classifier, which may be trained with a modified loss function to obtain the trained selective classifier. The modified loss function has at least one added term, relative to an original loss function, and the at least one added term decreases entropy.

22 Claims, 21 Drawing Sheets

(56) References Cited

PUBLICATIONS

Nontawat Charoenphakdee et al., Classification with rejection based on cost-sensitive classification, International Conference on Machine Learning, pp. 1507-1517. PMLR, 2021.
C. Chow, On optimum recognition error and reject tradeoff, IEEE Transactions on Information Theory, 160 (1):0 41-46, 1970. doi: 10.1109/TIT.1970.1054406.
Corinna Cortes et al., Boosting with abstention, Advances in Neural Information Processing Systems, 29, 2016.
Jia Deng et al., Imagenet: A large-scale hierarchical image database, IEEE conference on computer vision and pattern recognition, pp. 248-255. IEEE, 2009.
Thomas G Dietterich et al., The familiarity hypothesis: Explaining the behavior of deep open set methods, Pattern Recognition, 132:0 108931, 2022.
Michael Dusenberry et al., Efficient and scalable Bayesian neural nets with rank-1 factors, International Conference on Machine Learning, 2020.
Peter I. Frazier, A tutorial on bayesian optimization, arXiv preprint arXiv: 1807.02811, 2018.
Giorgio Fumera et al., Support vector machines with embedded reject option, International Workshop on Support Vector Machines, pp. 68-82. Springer, 2002.
Yarin Gal et al., Dropout as a Bayesian approximation: Representing model uncertainty in deep learning, International Conference on Machine Learning, 2016.
Yonatan Geifman et al., Selective classification for deep neural networks, Advances in neural information processing systems, 30, 2017.
Yonatan Geifman et al., SelectiveNet: A deep neural network with an integrated reject option, International Conference on Machine Learning, pp. 2151-2159. PMLR, 2019.
Yves Grandvalet et al., Semi-supervised learning by entropy minimization, Advances in neural information processing systems, 17, 2004.
Chuan Guo et al., On calibration of modern neural networks, International Conference on Machine Learning, pp. 1321-1330. PMLR, 2017.
Martin E. Hellman, The nearest neighbor classification rule with a reject option, IEEE Trans. Syst. Sci. Cybern., 6:0 179-185, 1970.
Dan Hendrycks et al., A baseline for detecting misclassified and out-of-distribution examples in neural networks, arXiv preprint arXiv: 1610.02136, 2016.
Alex Holub et al., Entropy-based active learning for object recognition, IEEE Computer Society Conference on Computer Vision and Pattern Recognition Workshops, pp. 1-8, 2008.
Lang Huang et al., Self-adaptive training: beyond empirical risk minimization, Advances in neural information processing systems, 33:0 19365-19376, 2020.
Lang Huang et al., Self-adaptive training: Bridging supervised and self-supervised learning, IEEE Transactions on Pattern Analysis and Machine Intelligence, pp. 1-17, 2022. doi: 10.1109/TPAMI.2022.3217792.
Erik Jones et al., Selective classification can magnify disparities across groups, International Conference on Learning Representations, 2021. URL: https://openreview.net/forum?id=N0M_4BkQ05i.
Jonathan Krause et al., 3d object representations for fine-grained categorization, 4th International IEEE Workshop on 3D Representation and Recognition (3dRR-13), Sydney, Australia, 2013.
Alex Krizhevsky, Learning multiple layers of features from tiny images. Apr. 8, 2009.
Balaji Lakshminarayanan et al., Simple and scalable predictive uncertainty estimation using deep ensembles, Advances in Neural Information Processing Systems, 2017.
Yann Lecun et al., Handwritten digit recognition with a back-propagation network, Advances in neural information processing systems, 2, 1989.
Joshua K Lee et al., Fair selective classification via sufficiency, Marina Meila and Tong Zhang (eds.), International Conference on Machine Learning, vol. 139 of Proceedings of Machine Learning Research, pp. 6076-6086. PMLR, Jul. 18-24, 2021.
Mingsheng Long et al., Unsupervised domain adaptation with residual transfer networks, Advances in neural information processing systems, 29, 2016.
Wesley J Maddox et al., A simple baseline for bayesian uncertainty in deep learning, Advances in Neural Information Processing Systems, 2019.
Matthias Minderer et al., Revisiting the calibration of modern neural networks, Advances in Neural Information Processing Systems, 34, 2021.
Hussein Mozannar et al., Consistent estimators for learning to defer to an expert, International Conference on Machine Learning, pp. 7076-7087. PMLR, 2020.
Pengzhen Ren et al., A survey of deep active learning, ACM Computing Surveys (CSUR), 54(9):1-40, 2021.
Olga Russakovsky et al., Imagenet large scale visual recognition challenge, International journal of computer vision, 115(3):211-252, 2015.
Yonglong Tian et al., Contrastive multiview coding, European conference on computer vision, pp. 776-794. Springer, 2020.
Tuan-Hung Vu et al., Advent: Adversarial entropy minimization for domain adaptation in semantic segmentation, Proceedings of the IEEE/CVF Conference on Computer Vision and Pattern Recognition, pp. 2517-2526, 2019.
Marten Wegkamp et al., Support vector machines with a reject option, Bernoulli, 170 (4):0 1368-1385, 2011.
Marten Wegkamp, Lasso type classifiers with a reject option, Electronic Journal of Statistics, 1:0 155-168, 2007.
Xiaofu Wu et al., Entropy minimization vs. diversity maximization for domain adaptation, arXiv preprint arXiv:2002.01690, 2020.
Liu Ziyin et al., Deep gamblers: learning to abstain with portfolio theory, Proceedings of the 33rd International Conference on Neural Information Processing Systems, pp. 10623-10633, 2019.

* cited by examiner

SELECTIVE CLASSIFICATION WITH ALTERNATE SELECTION MECHANISM

TECHNICAL FIELD

The present disclosure is directed to selective prediction models, and more particularly to the selection mechanism for selective prediction models.

BACKGROUND

A machine learning model's ability to abstain from a decision when lacking confidence is essential in mission-critical applications. This is known as the "selective prediction" problem setting. In particular, a model may have the option to abstain from making predictions. The abstained and uncertain samples can be flagged and passed to a human expert for manual assessment, which may be used to improve the re-training process. This is crucial in problem settings where user confidence in the system is critical or an incorrect prediction can have significant adverse consequences such as in the financial, medical, or autonomous driving settings.

Models that come with an abstain option and tackle the selective prediction problem setting are called selective models. The selective classification problem is a subset of the selective prediction problem. Current state-of-the-art approaches to the selection classification problem include SelectiveNet (Geifman et al., 2019), Self-Adaptive Training (Huang et al., 2020), and Deep Gamblers (Ziyin et al.), which are designed to either learn to select samples for prediction or learn to abstain from making predictions.

Overview of Selective Classification

The selective prediction task is formulated as follows. Let $\mathcal{X}$ be the feature space, $\mathcal{Y}$ be the label space, and $P(\mathcal{X}, \mathcal{Y})$ represent the data distribution over $\mathcal{X} \times \mathcal{Y}$. A selective model comprises a prediction function $f: \mathcal{X} \rightarrow \mathcal{Y}$ and a selection function $g: \mathcal{X} \rightarrow \{0,1\}$. The selective model decides to make predictions when $g(x)=1$ and abstains from making predictions when $g(x)=0$. The objective is to maximise the model's predictive performance for a given target coverage $c_{target} \in [0,1]$. The coverage is the proportion of the selected samples. The selected set is defined as $\{x: g(x)=1\}$. Formally, an optimal selective model, parameterised by $\theta^*$ and $\psi^*$, would be the following:

$$\theta^*, \psi^* = \arg\min_{\theta,\psi} \mathbb{E}_P[l(f_\theta(x), y) \cdot g_\psi(x)]$$
$$\text{s.t. } \mathbb{E}_P[g_\psi(x)] \geq c_{target}$$

where $\mathbb{E}_P[l(f_\theta(x), y) \cdot g_\psi(x)]$ is the selective risk. Naturally, a higher coverage is correlated to that of higher selective risk.

In practice, instead of a hard selection function $g_\psi(x)$, existing methods aim to learn a soft selection function $\bar{g}_\psi: \mathcal{X} \rightarrow \mathbb{R}$ such that larger values of $\bar{g}_\theta(x)$ indicate the datapoint should be selected for prediction. At test time, a threshold $\tau$ is selected for a coverage c such that $$g_\psi(x) = \begin{cases} 1 & \text{if } \bar{g}_\psi(x) \geq \tau \\ 0 & \text{otherwise} \end{cases}$$
$$\text{s.t. } \mathbb{E}[g_\psi(x)] \geq c_{target}.$$

In this setting, the selected (covered) dataset is defined as $\{x: \bar{g}_\psi(x) \geq \tau\}$. The process of selecting the threshold $\tau$ is known as calibration.

Learn to Select (SelectiveNet)

SelectiveNet (Geifman et al., 2019) is a three-headed network proposed for selective learning. A SelectiveNet model has three output heads for selection $\bar{g}$, prediction $f$, and auxiliary prediction h. The selection head infers the selective score of each sample, as a value between 0 to 1, and is implemented with a sigmoid activation function. The auxiliary prediction is trained with a standard (non-selective) loss function. Given a batch $$\{(x_i, y_i)\}_{i=1}^m,$$

where $y_i$ is the label, the model is trained to minimise the loss $\mathcal{L}$ where it is defined as:

$$\mathcal{L} = \alpha(\mathcal{L}_{selective} + \lambda\mathcal{L}_c) + (1-\alpha)\mathcal{L}_{aux}$$

$$\mathcal{L}_{selective} = \frac{\frac{1}{m}\sum_{i=1}^m \ell(f(x_i), y_i)\bar{g}(x_i)}{\frac{1}{m}\sum_{i=1}^m \bar{g}(x_i)}$$

$$\mathcal{L}_c = \max\left(0, \left(c_{target} - \frac{1}{m}\sum_{i=1}^m \bar{g}(x_i)\right)^2\right)$$

$$\mathcal{L}_{aux} = \frac{1}{m}\sum_{i=1}^m \ell(h(x_i), y_i)$$

where $\ell$ is any standard loss function. In the selective classification setting $\ell$ is the cross-entropy loss function. The coverage loss $\mathcal{L}_c$ encourages the model to achieve the desired coverage and encourages $\bar{g}(x_i)>0$ for at least $c_{target}$ proportion of batch samples in the batch. The selective loss $L_{selective}$ discounts the weight of difficult samples via the soft selection value $\bar{g}(x)$ term, encouraging the model to focus on easier samples for which the model is more confident. The auxiliary loss $L_{aux}$ ensures that all samples, regardless of their selective score ($\bar{g}(x)$), contribute to the learning of the feature model. $\lambda$ and $\alpha$ are hyperparameters. Unlike Deep Gamblers and Self-Adaptive Training, both described below, SelectiveNet requires the target-coverage, $c_{target}$, be decided before training, that is, a different model is trained for each target coverage $c_{target}$. The hyperparameter impacts the constrained optimization. In the original paper (Geifman et al., 2019), it has been suggested that the best performance is achieved when the training target coverage is equal to that of the evaluation coverage.

Learn to Abstain

Self-Adaptive Training (Huang et al., 2020) and Deep Gamblers (Ziyin et al.) propose to tackle the selective classification problem by introducing a $C+1^{th}$ class logit where the extra class logit represents abstention. Let $p_\theta(\cdot|x)$ represent the prediction network with a Softmax last layer. Ziyin et al. and Huang et al., 2020 propose to abstain if $p_\theta(C+1|x)$ is above a threshold. The notations of these abstention and selection methods can be unified under the same selective classification framework with the following soft selection function: $\bar{g}(x)=1-p_\theta(C+1|x)$.

Deep Gamblers

Inspired by portfolio theory, Deep Gamblers proposes to train the model using the following loss function given a batch:

$$\mathcal{L} = -\frac{1}{m}\sum_{i=1}^{m} p(y_i|x)\log\left(p_\theta(y_i|x) + \frac{1}{o}p_\theta(C+1|x)\right)$$

where m is the number of datapoints in the batch and o is a hyperparameter that controls the impact of the abstention logit and should be a value between 1 and C. Smaller values of o encourage the model to abstain more often. However, o<1 makes it ideal to abstain for all datapoints. In contrast, o>C makes it ideal to predict for all datapoints. Therefore, o is restricted to be between 1 and C. Note that the corresponding loss function with large values of o is approximately equivalent to the cross-entropy loss. Ziyin et al. compare Deep Gamblers with predictive entropy, using predictive entropy solely as a metric for identifying outliers and report qualitative results.

Self-Adaptive Training

In addition to learning a logit that represents abstention, Self-Adaptive Training proposes to use a convex combination of labels and predictions as a dynamically moving training target instead of the fixed labels. Let $y_i$ be the one-hot encoded representation of the label for a datapoint $(x_i, y_i)$ where $y_i$ is the label. Initially, the training target $t_i$ is set equal to the label $t_i \leftarrow y_i$. After each epoch, the training target is updated according to:

$$t_i \leftarrow \alpha \times_i + (1-\alpha) \times p_\theta(\alpha|x_i)$$

The model is trained to optimize a loss function that allows the model to also choose to abstain on difficult samples instead of making a prediction:

$$\mathcal{L} = -\frac{1}{m}\sum_{i=1}^{m}\left[t_{i,y_i}\log p_\theta(y_i|x_i) + \left(1-t_{i,y_i}\right)\log p_\theta(C+1|x_i)\right]$$

where m is the number of datapoints in the batch. The first term is similar to the cross-entropy loss and encourages the model to learn a good classifier. The second term encourages the model to abstain in making predictions for samples where the model is uncertain, i.e. $t_{i,y_i}$. This use of the dynamically moving training target allows the model to avoid fitting on difficult samples as the training progresses.

Other Techniques

Geifman et al., 2017 consider the task of learning a selective classifier (f, g), where f is a standard classifier and g is a rejection function where the selective classifier must enable full guaranteed control over the true risk. The authors consider a case where a (deep) neural classifier f already exists, but with no selection mechanism and the objective is to learn a rejection function g to achieve a desired error rate with high probability. They propose using the known rejection techniques of Softmax Response and Monte Carlo Dropout ("MC Dropout") and develop a learning method to choose an appropriate threshold so that for a given classifier f, confidence level δ, and desired risk r* the result will be a selective classifier (f, g) whose test error will be no larger than r* with probability of at least 1−δ. The authors propose this approach without rigorous justification. Geifman et al., 2017 specifically distinguish their approach from training a complete selective classifier, i.e. where "optimal performance can only be obtained if the pair (f, g) is trained together".

Thus, as described above, recent works have taken different approaches towards selection such as incorporating a selection head (Geifman et al., 2019) or an abstention logit (Huang et al., 2020, Ziyin et al.). In either case, a threshold is set such that selection and abstention values above or below the threshold decide the selection action. The SeletiveNet model (Geifman et al., 2019) proposes to learn a model comprising a selection head and a prediction head where the values outputted by the selection head determine whether the prediction is selected. Huang et al., 2020 and Ziyin et al. introduced an additional abstention logit for classification settings where the output of the additional logit determines whether or not the model abstains from making predictions on the sample. The results of these works suggest that the selection mechanism should focus on the output of the selection head or abstention logit.

SUMMARY

Broadly speaking, according to the present disclosure the selection mechanism for a selective classifier should be rooted in the classifier itself, rather than using external head/logit selection mechanisms. This method can be immediately applied to an already deployed selective classification model by replacing the existing trained selection mechanism with a selection mechanism based on classification scores to immediately improve performance at little cost. Additionally, applying entropy-minimization to the loss function improves the performance of the selective classification method.

In one aspect, a method for selective classification is provided. For a trained complete selective classifier having an existing trained selection mechanism, the trained selective classifier is modified to disregard the existing trained selection mechanism and, use, as a basis for an alternate selection mechanism, at least one classification prediction value.

In one embodiment, before modifying the trained selective classifier, the method commences with an untrained selective classifier, and trains the untrained selective classifier with a modified loss function to obtain the trained selective classifier, wherein the modified loss function has at least one added term, relative to an original loss function, and the at least one added term decreases entropy.

In another embodiment, before modifying the trained selective classifier, the method commences with an untrained selective classifier and trains the untrained selective classifier with the original loss function for the selective classifier to obtain the trained selective classifier.

In yet another embodiment, the method comprises, before modifying the trained selective classifier, receiving the trained selective classifier.

In one embodiment, the method uses predictive entropy for classification as the basis for the alternate selection mechanism. In another embodiment, the method uses maximum predictive class logit as the basis for the alternate selection mechanism.

In one embodiment, the trained selective classifier is a SelectiveNet network and the existing trained selection mechanism is a selection head.

In another embodiment, the existing trained selection mechanism uses a value of an abstention logit and the alternate selection mechanism ignores the abstention logit.

In one particular such embodiment, the trained selective classifier is a Self-Adaptive Training network. In another particular such embodiment, the trained selective classifier is a Deep Gamblers network.

In another aspect, a data processing system comprises at least one processor and memory coupled to the processor, wherein the memory contains instructions which, when implemented by the at least one processor, cause the at least one processor to implement an embodiment of the method described above.

In yet another aspect, a computer program product comprises a tangible non-transitory computer-readable medium containing instructions which, when executed by at least one processor of a computer, cause the computer to implement an embodiment of the method as described above.

BRIEF DESCRIPTION OF THE DRAWINGS

These and other features will become more apparent from the following description in which reference is made to the appended drawings wherein.

Figure 1A:
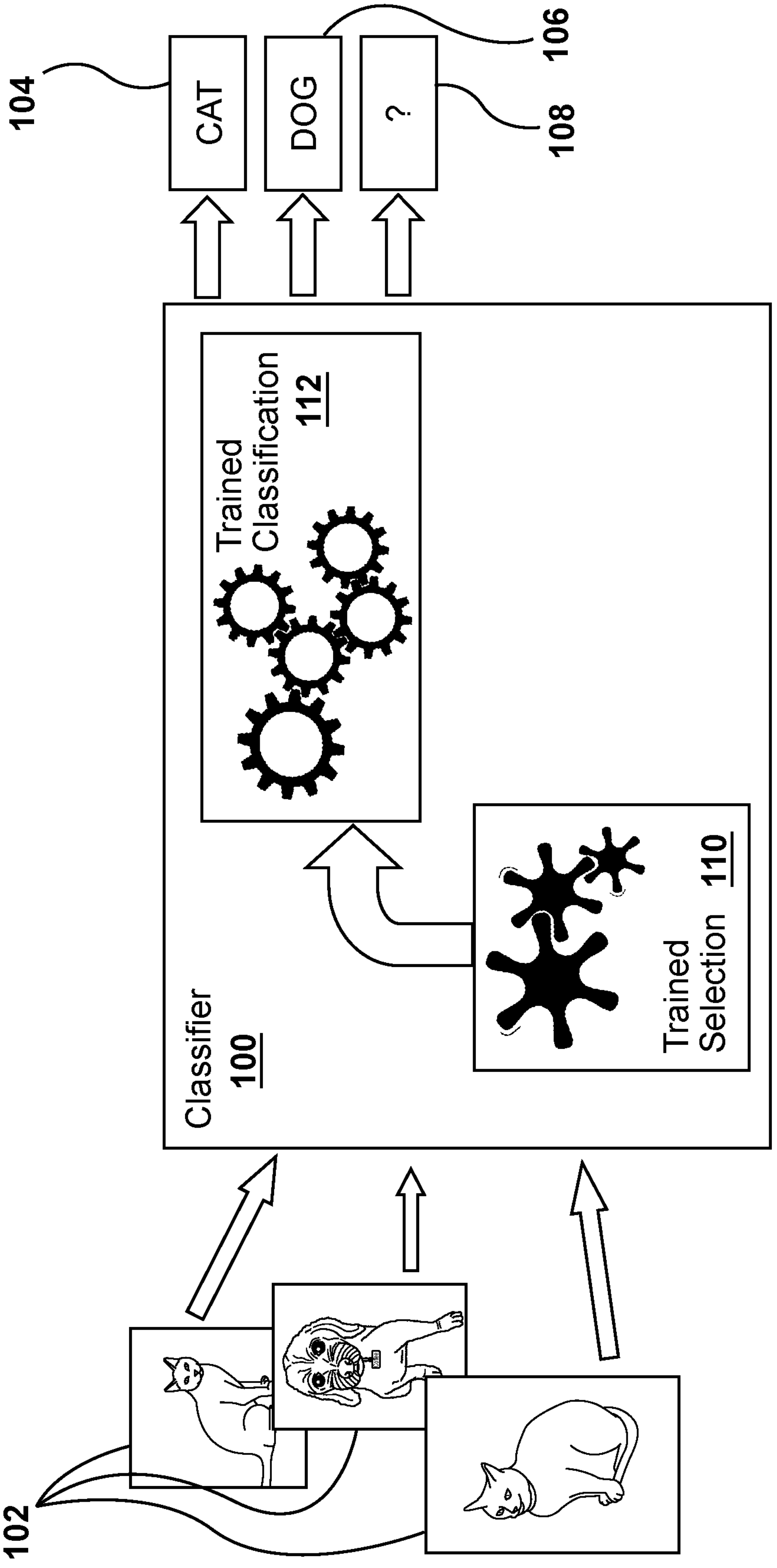
FIGS. 1A and 1B provide a simplified schematic illustration of a method for selective classification according to an aspect of the present disclosure.

The present disclosure describes the surprising and unexpected result that, contrary to common belief in the field of selective classification that the selection mechanism should focus on the output of the selection head or abstention logit, such a selection strategy is suboptimal. Instead, a selection strategy performs best when driven directly from the prediction head signal.

In one aspect, the present disclosure provides theoretical underpinnings for two selection mechanisms based on the predictive entropy and the maximum predictive class logit (Softmax Response) for a C-way classifier trained with the cross-entropy loss. The present disclosure describes Softmax Response and entropy with theoretical justification by analyzing the optimization objective. In particular, the present disclosure demonstrates the utility of these selection mechanisms for a classifier trained with cross-entropy loss and improves upon the current state-of-the-art methods that use a selection head or abstention logit with the proposed selection mechanism. During testing, instead of selecting according to the selection head or abstention logits, according to aspects of the present disclosure, selections are made based on the C-way prediction network. Two illustrative soft selection functions g, based on predictive entropy and maximum predictive class logits, will now be described.

Selection Mechanisms

In the selective classification problem setting, the objective is to select $c_{target}$ proportion of samples for prediction according to the value output by a selection function. Since each datapoint $(x_i, y_i)$ is sampled i.i.d., at any given moment, it is optimal to iteratively select the sample x* from the dataset $\mathcal{D}$ that maximizes the selection function, i.e. $x^*=\mathrm{argmax}_{x\in\mathcal{D}}\,\overline{g}(x)$, until the target coverage $c_{target}$ proportion of the dataset is reached. To select a coverage of $c_{target}$, it is sufficient to define the metric for selection, i.e. $\overline{g}$, and select a threshold τ such that exactly $c_{target}$ proportion of samples are above the threshold, i.e. exactly $c_{target}$ proportion of samples satisfy $\overline{g}(x)>\tau$. Let $p_\theta(y|x)$ be a classifier parameterised by θ trained on $P(\mathcal{X},\mathcal{Y})$ with the cross-entropy loss. As a result, $p_\theta(y|x)$ can be interpreted as an approximation of the true distribution $p(y|x)$.

Architecture Modification vs. Selecting According to the Classifier

Selective models may be provided with architecture modifications such as an external logit/head. These architecture modifications, however, act as regularization mechanisms that allow the method to train more generalizable classifiers. As a result, any improvement resulting from these models could actually be attributed to their classifiers being more generalizable. For these selective models to have strong performance in selective classification they require the external logit/head to generalize in the sense that the external logit/head must select samples for which the classifier is confident of its prediction. Since the logit/head has its own set of learned model parameters, this adds another potential mode of failure for a selective model. Specifically, the learned parameters can fail to generalize and the logit/head may (1) suggest samples for which the classifier is not confident and (2) reject samples for which the classifier is confident. To avoid this potential additional failure mode, the selection mechanisms should stem from the classifier itself, rather than from an external logit/head.

The cross-entropy loss function is a popular loss function for classification due to its differentiability. However, during evaluation, the most utilized metric is accuracy, i.e., whether a datapoint is predicted correctly. In the cross-entropy objective of the conventional classification settings, $p(c|x_i)$ is a one-hot encoded vector; therefore, the cross-entropy loss can be simplified as $$CE(p(\cdot|x_i), p_\theta(\cdot|x_i)) = -\sum_{u=1}^{C} p(u|x_i)\log p_\theta(u|x_i) = -\log p_\theta(y_i|x_i),$$

i.e., during optimization, the logit of the correct class is maximized. Accordingly, the maximum value of logits can be interpreted as the model's relative confidence of its prediction. Therefore, a simple selection mechanism for a model would be to select according to the maximum predictive class score, $\bar{g}(x)=\max_{u\in(1,\ldots C)} p_\theta(u|x_i)$ (aka Softmax Response (Geifman et al., 2017). Alternatively, a model can also select according to its predictive entropy $\bar{g}(x)=-H(p_\theta(\cdot|x))$, a metric of the model's uncertainty, as described above.

Selecting via Predictive Entropy

In classification, the training objective is often to minimize the cross-entropy loss, i.e.

$$CE(p(\cdot|x), p_\theta(\cdot|x)) = -\sum_{i=1}^{C} p(i|x)\log p_\theta(i|x).$$

The loss value is a metric of how well the model can predict the sample. At test time, given a dataset of datapoints $\mathcal{D}$, if the labels were available, the optimal metric to select the datapoint $x\in\mathcal{D}$ that minimizes the loss function would be according to:

$$\operatorname{argmin}_{x\in\mathcal{D}} CE(p(\cdot|x), p_\theta(\cdot|x))$$

However, at test time, the labels are unavailable. Instead, the model's belief about what the label is, i.e. the learned approximation $p_\theta(\cdot|x)\approx p(\cdot|x)$, can be used. In particular, $CE(p_\theta(\cdot|x), p_\theta(\cdot|x))=H(p_\theta(\cdot|x))$ where H is the entropy function. As a result, selection can be according to:

$$\operatorname{argmin}_{x\in\mathcal{D}} CE(p(\cdot|x), p_\theta(\cdot|x)) \approx \operatorname{argmin}_{x\in\mathcal{D}} H(p_\theta(\cdot|x))$$

Figure 3A:
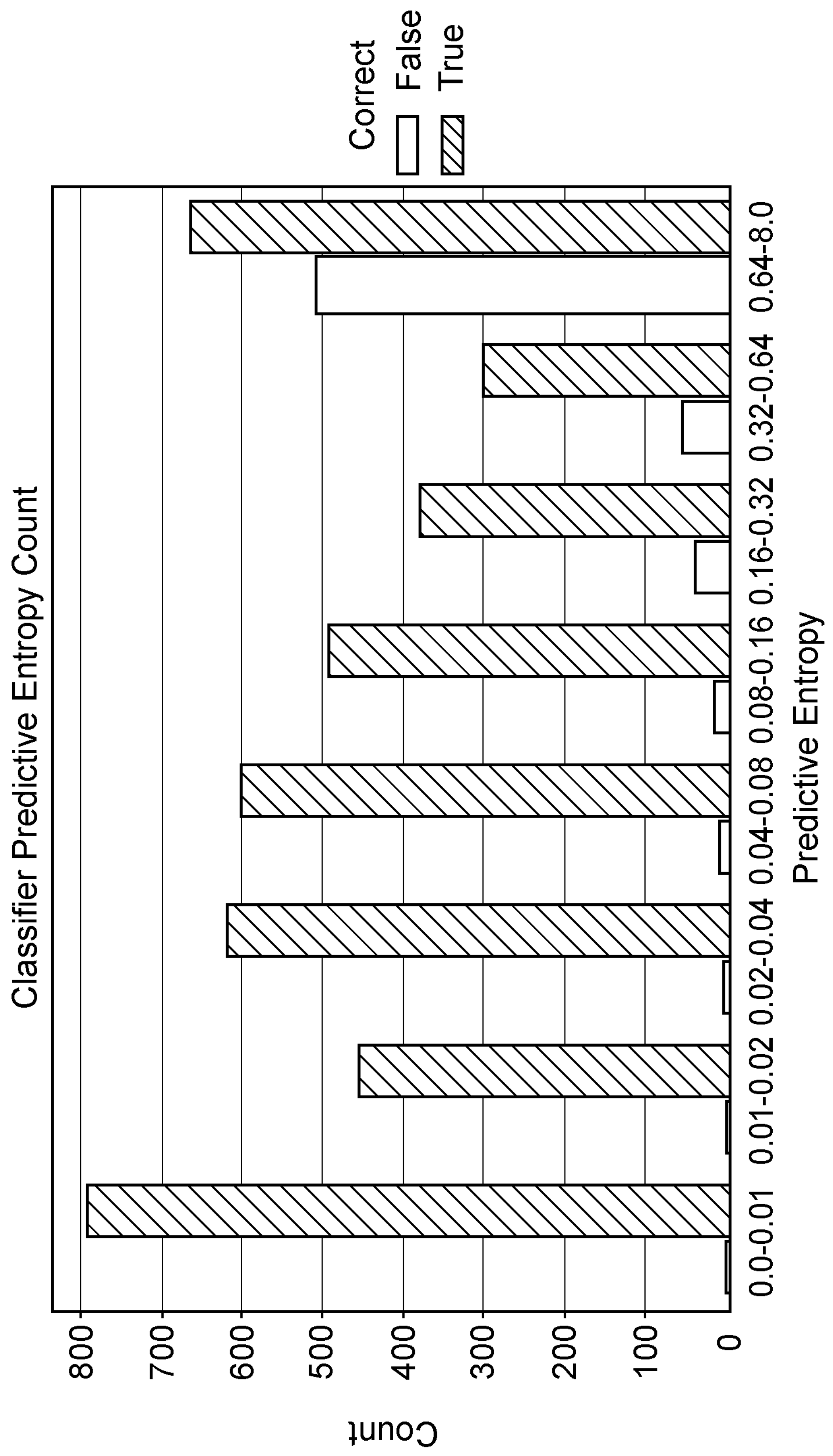
FIGS. 3A and 3B are histograms showing results for a standard classifier trained on the Imagenet100 dataset (as defined herein)

In other words, entropy is an approximation for the unknown loss function. As a result, it is advantageous to select samples according to the entropy to minimize the test loss. Fitting into the framework, the samples with the largest negative entropy value, i.e. $\bar{g}(x)=-H(p_\theta(\cdot|x))$, should be selected. FIG. 3A shows results from a standard or "vanilla" classifier trained on the Imagenet100 dataset (as defined below), where the x-axis indicates the entropy and the y-axis indicates the number of samples, with the bars on the right indicating the samples for which the model correctly predicts the class of the sample and the bar on the left indicating samples for which the model incorrectly predicted the class. In the case of entropy, a lower value corresponds to higher model confidence. From FIG. 3A, it can be seen that lower entropy is very strongly correlated with the model's prediction being correct and is this a good selection metric.

Selecting Via Maximum Predictive Class Logit (Softmax Response)

In practice, the cross-entropy loss function is often optimized in a classification problem due to its differentiability. However, often the value of greatest importance is the model's accuracy.

An interpretation of $p_\theta(u|x)$ is a probability estimate of the true correctness likelihood, the likelihood that u is the correct label of x. Let $y_i$ be the correct label for $x_i$. For example, given 100 samples $\{x_1, \ldots, x_{100}\}$ with $p_\theta(u|x_i)=0.8$, we would expect approximately 80% of the samples to have u as its label. As a result, $p_\theta(y_i|x_i)$ is the model's probability estimate that the correct label is $y_i$. In this case, the objective would be to select the datapoint $x_j$ where the model is most likely going to select the true label:

$$j\in \operatorname{argmax}_i p_\theta(y_i|x_i)$$

Unfortunately at test time, the labels are unavailable. However, the probability that the classifier selects the true label can be written as follows:

$$p_\theta(y_i|x_i)=\max_{u\in(1,\ldots C)} p(u|x_i)p_\theta(u|x_i)$$

Substituting the value allows the selection to be rewritten as:

$$j\in \operatorname{argmax}_i(\max_{u\in(1,\ldots C)} p(u|x_i)p_\theta(u|x_i))$$

The classifier $p_\theta(\cdot|x)$ can be exploited as a learned approximation of the true data distribution $p(\cdot|x)$.

$$j\in \operatorname{argmax}_i(\max_{u\in(1,\ldots C)}(p_\theta(u|x_i))^2)$$

$$\in \operatorname{argmax}_i(\max_{u\in(1,\ldots C)} p_\theta(u|x))$$

As a result, this selection is equivalent to selecting according to the soft selection function $\bar{g}(x)=\max_{u\in(1,\ldots C)} p_\theta(u|x)$. This is equivalent to selecting according to the maximum class logit (aka Softmax Response).

Figure 3B:
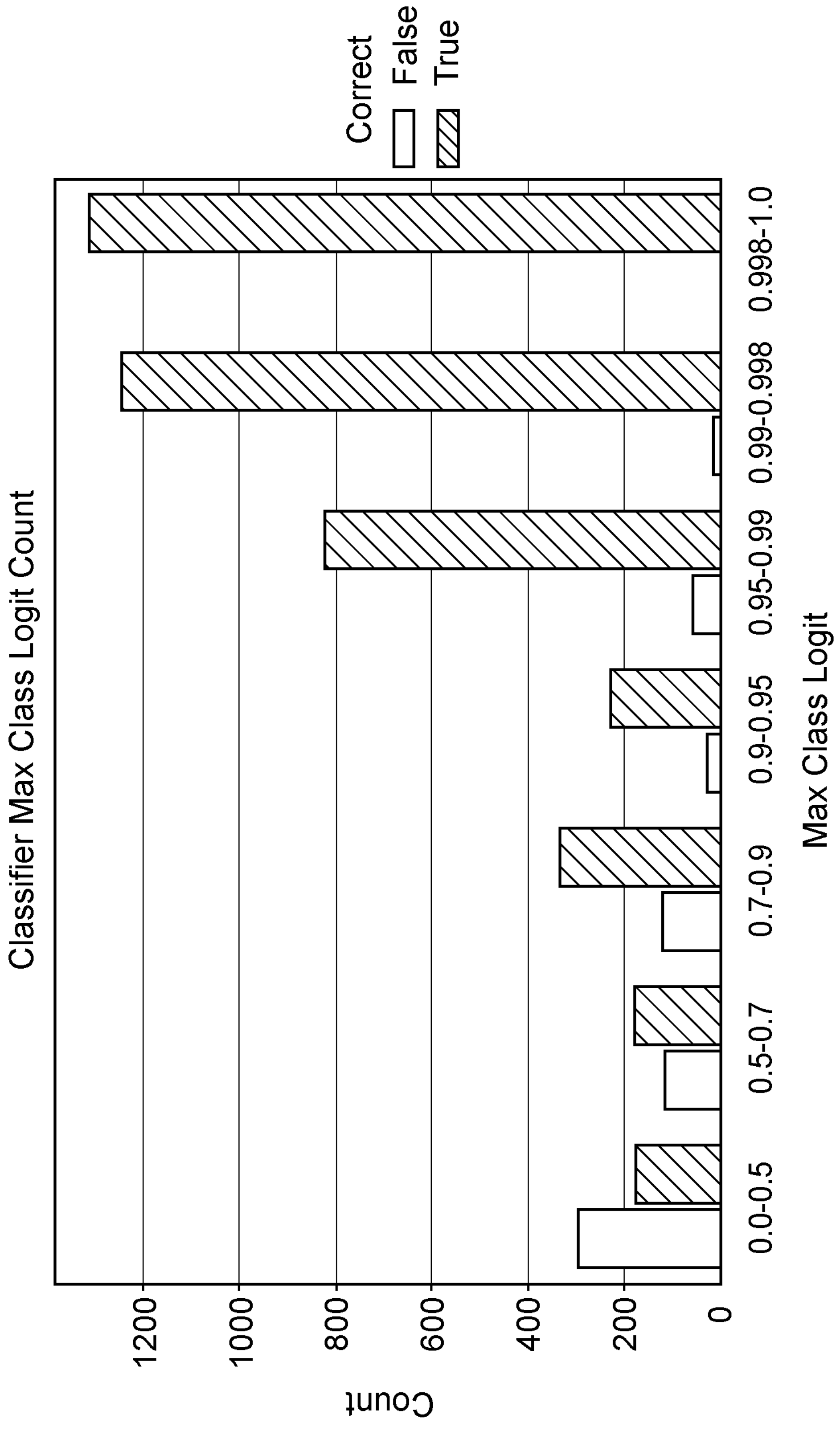

In practice, neural network models are not guaranteed to have well-calibrated confidences. In selective classification, however, a threshold is applied according to τ and samples above the threshold τ are selected for classification, avoiding use of the exact values of the confidence (max class logit). As a result, the model need not necessarily have well-calibrated confidences. Instead, it suffices if samples with higher confidences (max class logit) have a higher likelihood of being correct. In contrast to entropy, in the case of max class logit, a higher value corresponds to higher model confidence. FIG. 3B shows the distribution of max class logit for a trained standard or "vanilla" classifier, empirically showing larger max class logit to be strongly correlated with model's ability to correctly predict the label. As a result, max class logit is a good selection mechanism.

Illustrative Implementation

Broadly speaking, according to one aspect of the disclosure, a method of selective classification is provided as follows. First, a selective classifier is trained. Then, its selection mechanism is discarded, and instead, a classifier-based selection mechanism is used to rank the samples. Finally, a threshold value r, based on the validation set, is calculated to achieve the desired target coverage and select samples with max logit greater than T.

Where the selective classifier is SelectiveNet, the selection mechanism is discarded by ignoring the selection head, and for Self-Adaptive Training and Deep Gambler, the selection mechanism is discarded by ignoring the additional abstain logit and computing the final layer's softmax on the original C class logits. The classifier-based selection mechanism may be an entropy-based selection mechanism or Softmax Response, both of which are expected to outperform selecting according to the external head/logit. In certain experiments, Softmax Response performed better than an entropy-based selection mechanism. Softmax Response does not require retraining and can be immediately applied to already deployed models.

In particular embodiments, selection is as follows:

SelectiveNet: At test time, ignore the selection head, and instead, use the predictive entropy or the maximum predictive class logit as a soft selection value.

Self-Adaptive Training and Deep Gamblers: At test time, ignore the additional abstention logit. Instead of computing the final layer's Softmax on C+1 logits, compute the Softmax on the C class logits. Afterwards, the predictive entropy or maximum predictive class logit can be computed and be used as a soft selection value instead of the abstention logit.

Thus, the predictive entropy or the maximum predictive class logit are each an example of a classification prediction value.

Figure 1B:
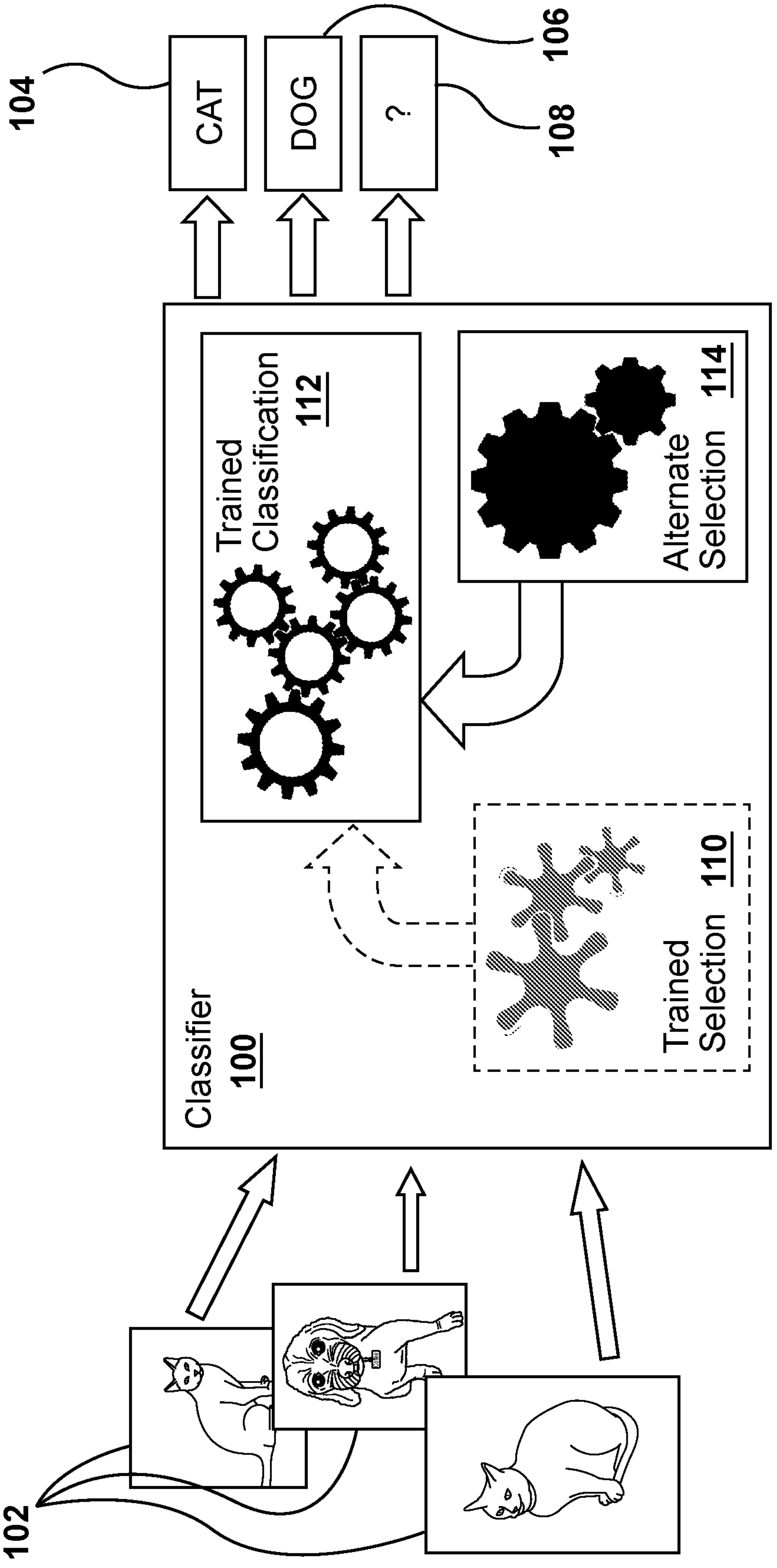

FIGS. 1A and 1B provide a simplified schematic illustration of a method for selective classification according to an aspect of the present disclosure. As shown in FIG. 1A, an illustrative trained complete selective classifier 100 is provided. The illustrative classifier 100 receives images 102 of animals, such as cats and dogs, and generates predictions as to what class of animal is shown in the images, and may make a "CAT" prediction 104 or a "DOG" prediction 106. Because the classifier 100 is a selective classifier, it may also abstain 108 from making a prediction. The classifier 100 includes an existing trained selection mechanism 110 and a trained classification mechanism 112. The trained selection mechanism 110 determines whether or not to make a prediction (i.e. whether to abstain) and the trained classification mechanism 112 makes the prediction (e.g. "CAT" or "DOG"). The classifier 100 may be, for example, a SelectiveNet classifier for which the trained selection mechanism 110 comprises a selection head, or a Self-Adaptive Training classifier or a Deep Gamblers classifier, in which case the trained selection mechanism 110 comprises an abstention logit. It will be appreciated that the illustrative classifier 100 is a highly simplified classifier, shown merely for purposes of schematically illustrating a method for selective classification according to an aspect of the present disclosure; the methods, systems and computer program products described herein are applicable to selective classifiers of far greater complexity.

With reference now to FIG. 1B, according to the presently described method for selective classification, the classifier 100 is modified to disregard the existing trained selection mechanism 110, now shown in dashed lines to indicate that it is disregarded, and instead use an alternate selection mechanism 114 based on at least one classification prediction value. Predictive entropy for classification, or maximum predictive class logit, may be used as classification prediction values. The existing trained classification mechanism 112 continues in use for making predictions.

Figure 2A:
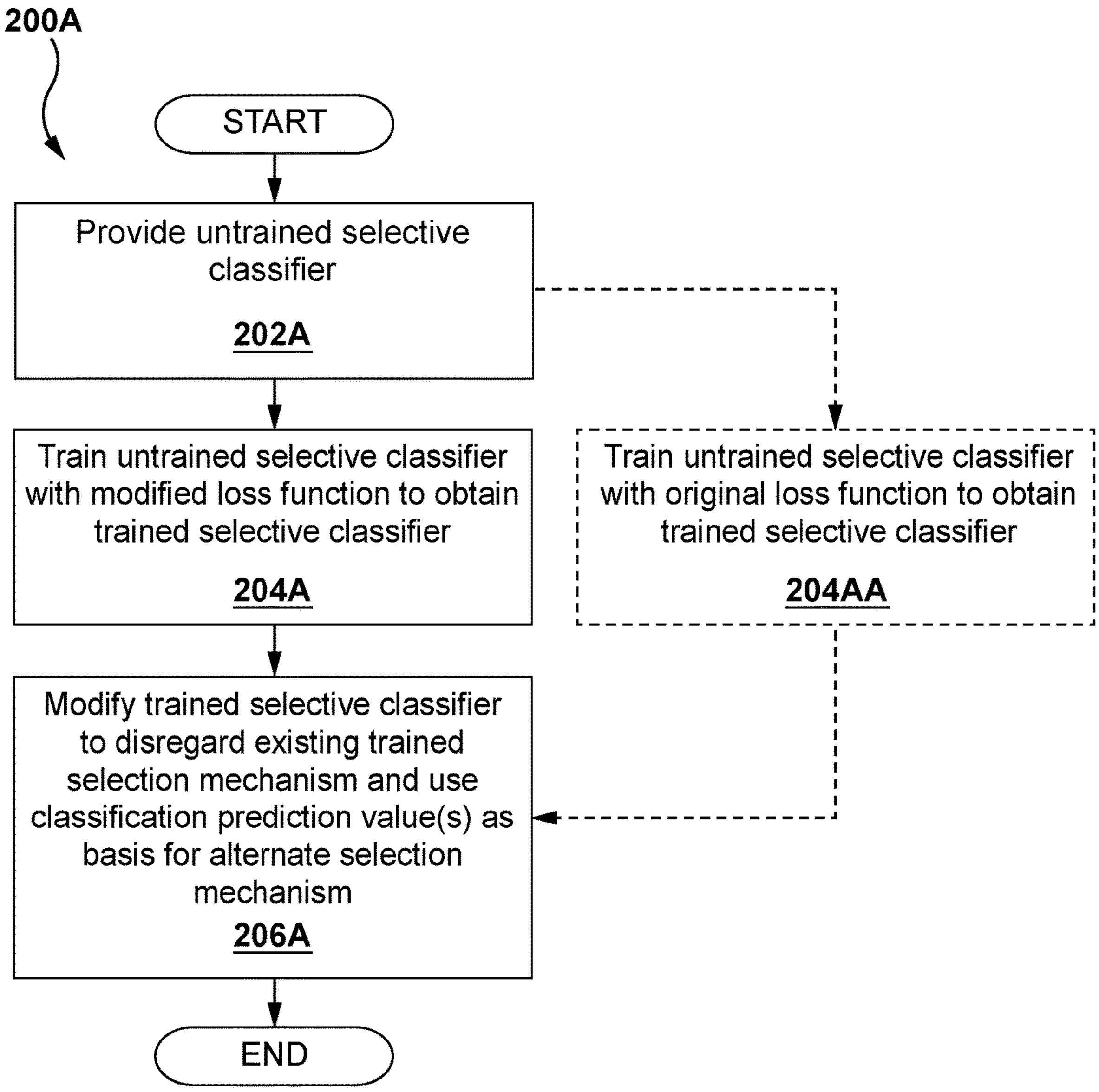
FIG. 2A is a flow chart showing a first illustrative method for selective classification according to an aspect of the present disclosure.

Reference is now made to FIG. 2A, which is a flow chart showing a first illustrative method 200A for selective classification according to an aspect of the present disclosure.

At step 202A, the method 200A commences with an untrained selective classifier being provided. This may be, for example, a SelectiveNet network, a Self-Adaptive Training network or a Deep Gamblers network.

At step 204A, the method 200A trains the untrained selective classifier with a modified loss function to obtain a trained selective classifier. The modified loss function has at least one added term, relative to the original loss function for the selective classifier; the additional term(s) decrease entropy (decrease uncertainty in the prediction). In one non-limiting illustrative embodiment, the added term is an entropy minimization term added to the objective loss function (which then becomes an entropy-regularized loss function) as follows:

$$\mathcal{L}_{new}=\mathcal{L}+\beta\,\mathcal{H}(p_\theta(\cdot|x)),$$

where β is a hyperparameter that controls the impact of the bonus. Experimental results suggest that a value of β=0.01 performs well in practice, although this is not intended to be limiting. Entropy minimization uses the information of all of the samples and increases the model's confidence in its predictions, including the unlabeled samples, resulting in an improved classifier. The entropy minimization term encourages the model to be more confident in its predictions, i.e., increasing the value of the maximum logit (increasing the confidence of the predicted class) and decreasing the predictive entropy during training. The entropy minimization term discourages low-confidence predictions, allowing for better disambiguation between samples that should be selected and samples that should not. The larger coefficient on the cross-entropy term compared to that of the entropy minimization term prioritizes increasing the confidence of correct predictions, benefitting Softmax Response. In alternate embodiments, the untrained selective classifier may be trained with the original loss function for the selective classifier, i.e. without an entropy minimization term, as shown by dashed alternate step 204AA.

After step 204A, the method 200A will have produced a trained, complete selective classifier having an existing trained selection mechanism. Of note, this differs from the mechanism proposed in Geifman et al., 2017, which provides a non-selective classifier *f* coupled with a separate rejection function g. If the untrained selective classifier is a SelectiveNet network, the trained selective classifier will also be a SelectiveNet network and the existing trained selection mechanism will be a selection head. If the untrained selective classifier is a Self-Adaptive Training network then the trained selective classifier is also a Self-Adaptive Training network, and similarly if the untrained selective classifier is a Deep Gamblers network then the trained selective classifier is a Deep Gamblers network.

At step 206A, the method 200A modifies the trained selective classifier to disregard the existing trained selection mechanism and use, as a basis for an alternate selection mechanism, at least one classification prediction value. Preferably, a single classification prediction value is used as the basis for the alternate selection mechanism. The classification prediction value may be, for example, predictive entropy for classification, or maximum predictive class logit. Thus, in one embodiment, the modified trained selective classifier may use predictive entropy for classification as the basis for the alternate selection mechanism, and in another embodiment, the modified trained selective classifier may use maximum predictive class logit as the basis for the alternate selection mechanism. If the trained selective classifier is a SelectiveNet network, the existing trained selection head will be ignored, and similarly if the existing trained selection mechanism uses the value of an abstention logit (value of a C+1$^{th}$ indexed logit after Softmax where C is a number of classes for the trained selective classifier and the logits consist of one logit for each of the classes and an additional abstention logit), the alternate selection mechanism will ignore the abstention logit. The terms "disregard" and "ignore", as used in this context, include cases where the existing trained selection mechanism remains within the computer program code implementing the model but is not used for selection, as well as cases in which the existing trained selection mechanism is actually removed from the computer program code. For example, the computer code may be modified with additional instructions such that the part of the computer code implementing the existing trained selection mechanism is not executed, in favor of computer code implementing the alternate selection mechanism.

Notably, the selection mechanisms according to the present disclosure do not require any retraining of the models. Instead, the new soft selection functions can be applied to existing models based solely on the prediction network for the C classes. This mechanism can be readily applied to already trained models with small additional computational cost.

Figure 2B:
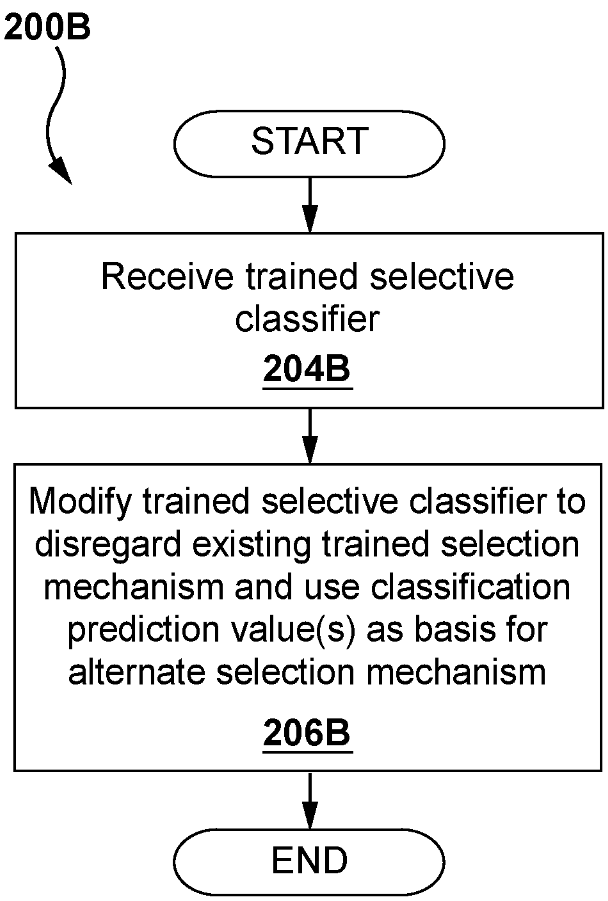
FIG. 2B is a flow chart showing a second illustrative method for selective classification according to an aspect of the present disclosure.

FIG. 2B shows a second illustrative method 200B for selective classification. The method 200B shown in FIG. 2B is similar to the method 200A shown in FIG. 2A, except that instead of beginning with an untrained selective classifier, the method 200B begins at step 204B by receiving a trained, complete selective classifier having an existing trained selection mechanism. The trained selective classifier received at step 204B may have been trained without the use of a modified loss function. At step 206B, the method 200B modifies the trained selective classifier to disregard the existing trained selection mechanism and use, as a basis for an alternate selection mechanism, at least one classification prediction value.

The optimization of SelectiveNet's selective loss $\mathcal{L}_{selective}$ as described above aims to learn a selection head (soft selection model) g that outputs a low selection value for inputs with large cross-entropy loss and high selection value for inputs with low cross-entropy loss. However, good performance of SelectiveNet at a test time is reliant on the generalization of two separate heads. For good performance, the selection head must be able to predict which samples the prediction head is confident about. However, learned models can at times fail to generalize. FIGS. 4A through 4D show that SelectiveNet's original selection mechanism selects several samples with large entity and low max class logit.

Figure 4A:
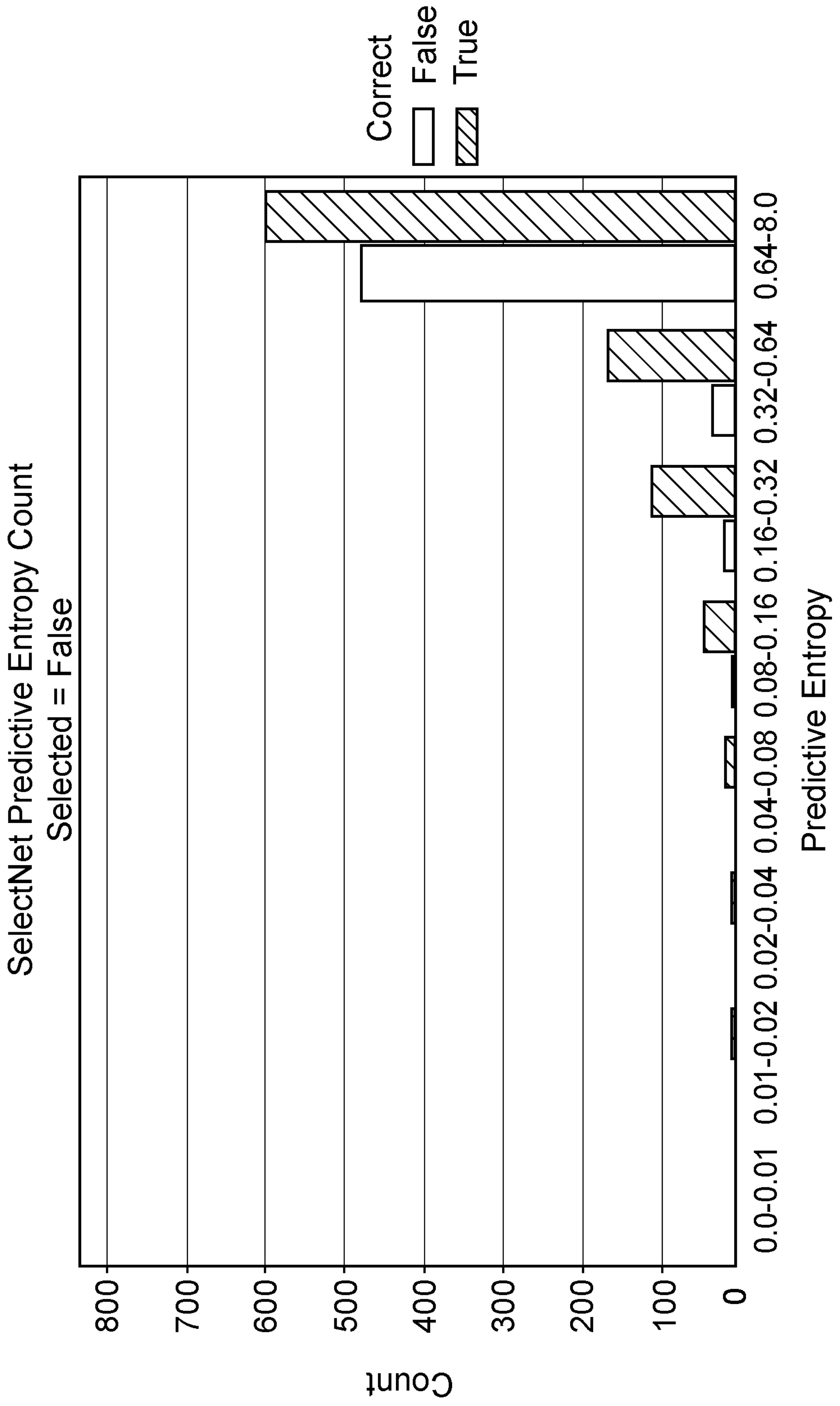
FIGS. 4A and 4B show predictive entropy count results for SelectiveNet trained on the Imagenet100 dataset (as defined herein) for a target coverage of 0.8 and evaluated on a coverage of 0.8 where FIG. 4A indicates datapoints that were not selected by the selection head and FIG. 4B indicates datapoints that were selected by the selection head.
Figure 4B:
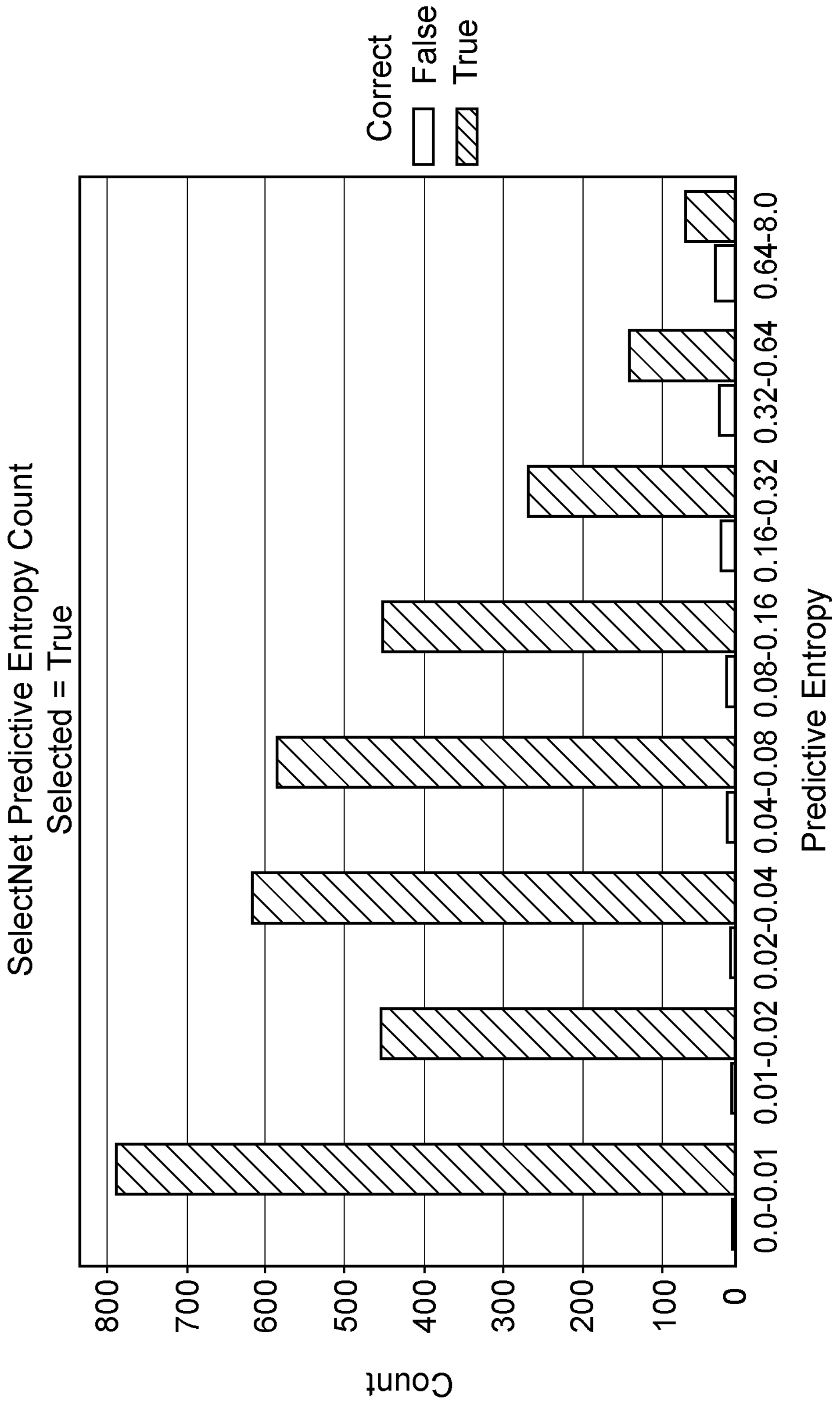

FIGS. 4A and 4B show predictive entropy count results for SelectiveNet trained on the Imagenet100 dataset (as defined below) for a target coverage of 0.8 and evaluated on a coverage of 0.8. FIG. 4A indicates datapoints that were not selected by the selection head, i.e. datapoints with low selection value $h(x)<\tau$. FIG. 4B indicates datapoints that were selected by the selection head, i.e. datapoints with high selection value $h(x)\geq\tau$. For entropy, a lower value corresponds to higher model confidence. In FIG. 4B, it can be seen that the selective model has learned to select images with low entropy but has also selected images with high predictive entropy that are more likely incorrect. Instead of relying on the selection value, which acts as a proxy for low entropy, SelectiveNet's accuracy can benefit from selecting based on the prediction head's entropy.

Figure 4C:
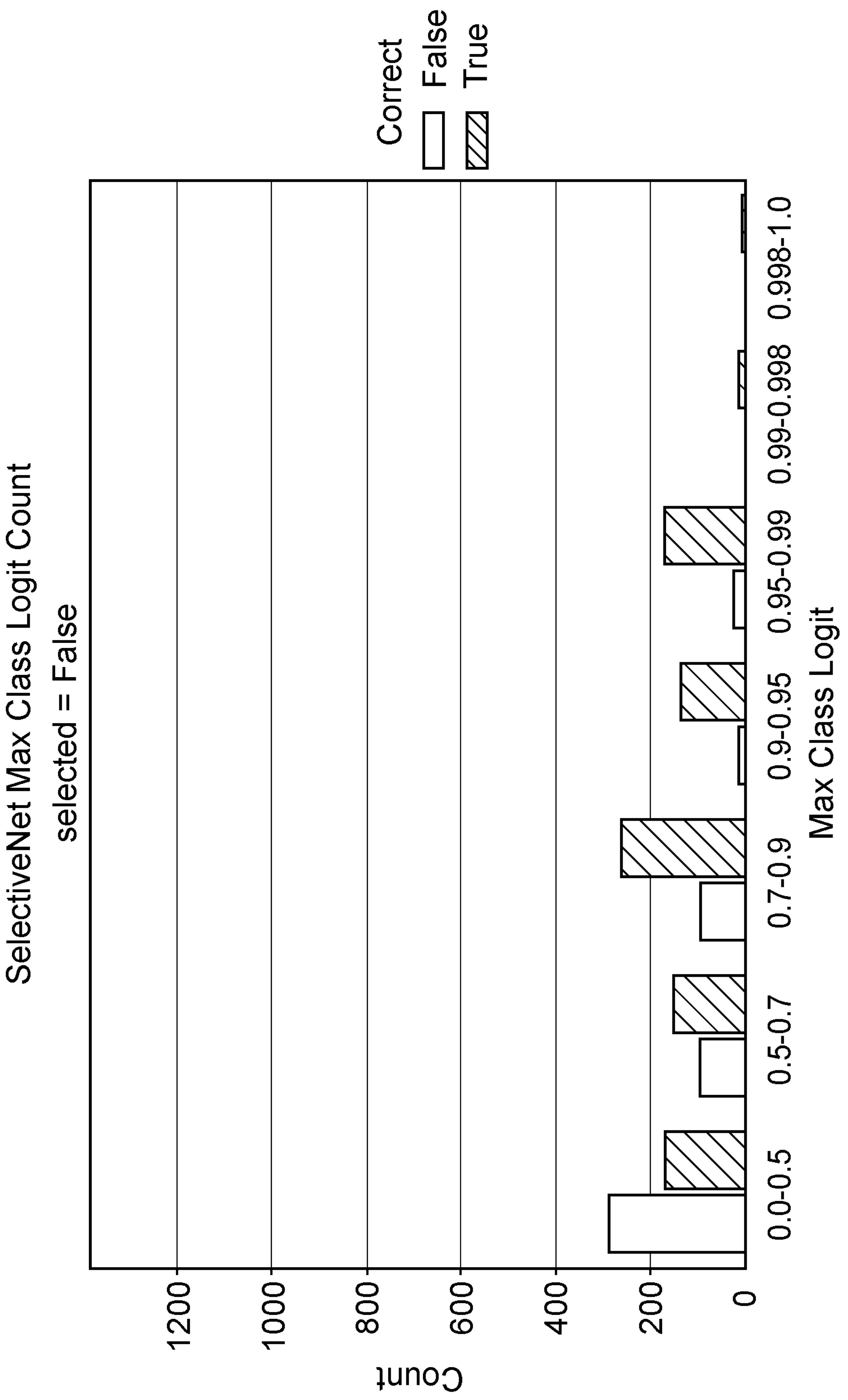
FIGS. 4C and 4D show max class logit count results for SelectiveNet trained on the Imagenet100 dataset (as defined herein) for a target coverage of 0.8 and evaluated on a coverage of 0.8 where FIG. 4C indicates datapoints that were not selected by the selection head and FIG. 4D indicates datapoints that were selected by the selection head.
Figure 4D:
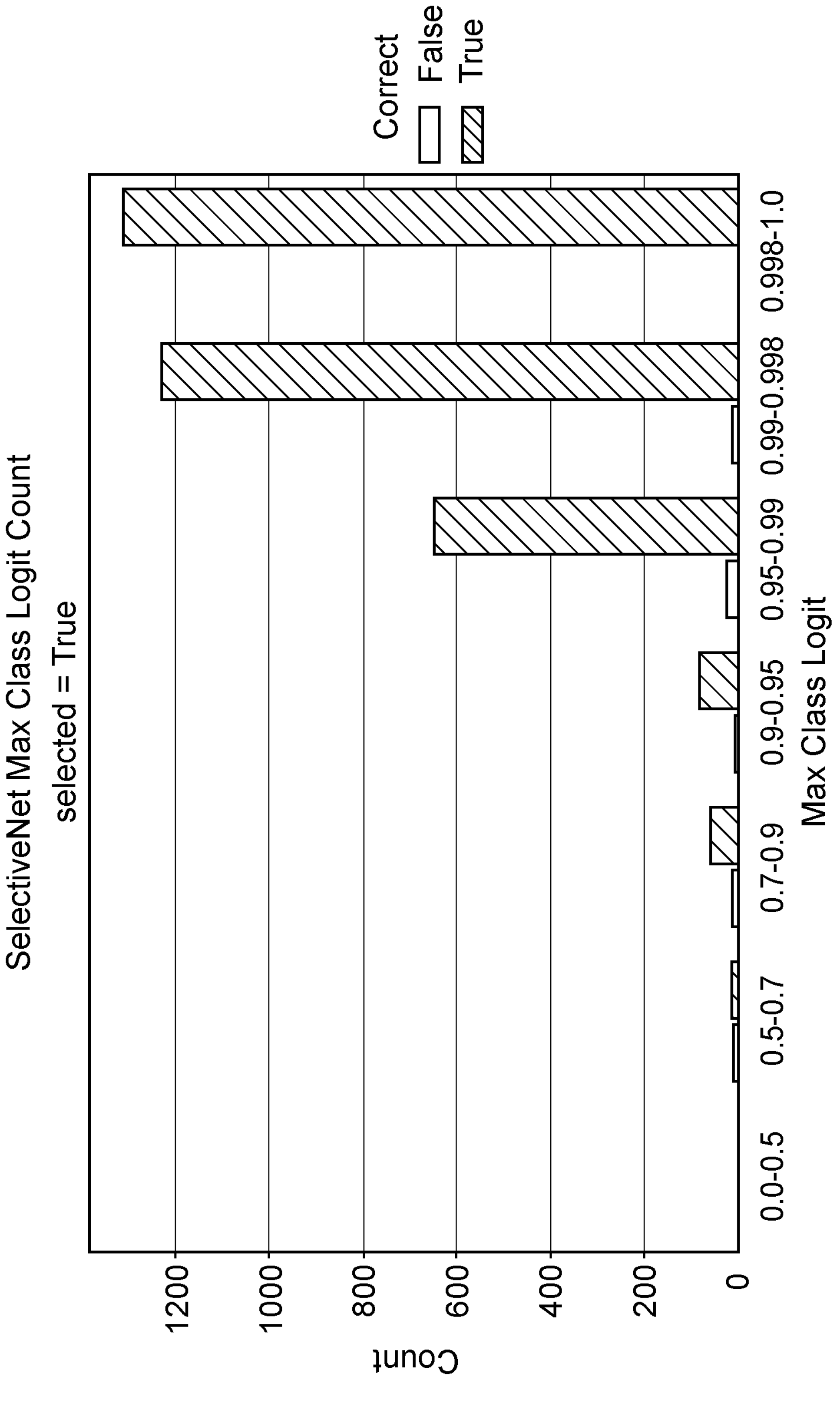

FIGS. 4C and 4D show maximum predictive class logit count results for SelectiveNet trained on the Imagenet100 dataset (as defined herein) for a target coverage of 0.8 and evaluated on a coverage of 0.8. FIG. 4C indicates datapoints that were not selected by the selection head, i.e. datapoints with low selection value $h(x)<\tau$. FIG. 4D indicates datapoints that were selected by the selection head, i.e. $h(x)\geq\tau$. As can be seen, SelectiveNet's accuracy can benefit from selecting based on the maximum predictive class logit.

During testing, instead of selecting according to the selection head and abstain logits, predictions may be made solely based on the C-way prediction network. For SelectiveNet, at test time, the selection head may be ignored, and instead, the predictive entropy or the maximum predictive class logit is used as a soft selection value. For Self-Adaptive Training and Deep Gamblers, at test time, the additional abstention logit is ignored. Instead of computing the final layer's Softmax on C+1 logits, compute the Softmax on the C class logits. Afterwards, the predictive entropy or maximum predictive class logit can be computed and be used as a soft selection value.

Initial Experiments

Initial experimental results, as detailed below, demonstrate that either of the selection mechanisms (entropy and Softmax Response) described herein outperform the original selection mechanisms for three previously state-of-the-art methods (SelectiveNet, Deep Gamblers, and Self-Adaptive Training).

Initial Datasets

Existing work has focused on "toy" datasets with few classes (10 or less), low resolution images (64×64 or less), and high coverages (70%+). In addition, the results on the previously introduced datasets clearly show saturation, e.g., 99.7% accuracy at the lowest coverages 70%, discouraging experiments with coverages below 70%. As a result, it is difficult to draw conclusions from the experiments performed on these datasets.

Experiments to validate embodiments of the present disclosure make use of the CIFAR-10 dataset as well as two datasets considered to be more realistic non-saturated datasets that can be evaluated and a wide range of coverages (10-100%): Imagenet100 and ImagenetSubset. The datasets used for initial experimental validation are defined as follows:

CIFAR-10. (Krizhevsky) The CIFAR-10 dataset comprises small images: 50,000 images for training and 10,000 images for evaluation split into 10 classes. Each image is of size 32×32×3. The selective classifiers are evaluated on coverages ranging from 70% to 100% in increments of 5%.

Imagenet100. This dataset extends a subset of Imagenet (Deng et al., Russakovsky et al.), described further below, originally proposed by Tian et al., to the selective prediction problem setting. The dataset consists of 100 classes sampled from Imagenet. The model is trained on the training dataset and evaluated on the validation dataset. The training data comprises approximately 1,300 images per class. Evaluation is performed on the validation images, comprising 5,000 images split into 100 classes. Evaluation may be on a varied range of coverages between 10% and 100% in increments of 10% for a complete comparison across all coverages. Imagenet100 is proposed as a more realistic non-saturated dataset that can be evaluated at a wide range of coverages (10-100%).

ImagenetSubset. This dataset is also based on Imagenet. For a more complete measure of the performance between the different methods, datasets may vary the number of classes from 25 to 175 in increments of 25, varying the difficulty of the task. The classes are sampled randomly such that datasets with fewer classes are subsets of those with more classes. As a result, the model's performance as the difficulty of the task increases, i.e. scalability, can be evaluated. The list of classes were sampled randomly. The classes used in this dataset are listed in the Appendix. Similarly to Imagenet100, the training data comprises approximately 1,300 images per class. Evaluation is on the validation images, comprising 50 images per class, at a coverage of 70%. Note that the dataset of Imagenet-Subset with 100 classes is a different dataset than that of Imagenet100.

Initial Experiment Implementation

Experiments with Deep Gamblers and Self-Adaptive Training were performed using the official repositories, available for Deep Gamblers at https://github.com/Z-T-WANG/NIPS2019DeepGamblers and for Self-Adaptive Training at https://github.com/LayneH/SAT-selective-cls, each of which is incorporated by reference. Experiments run with SelectiveNet used an implementation following the details provided in the original paper (Geifman et al., 2019), which is incorporated by reference.

For the CIFAR-10 experiments, the experimental details proposed in the original papers of SelectiveNet (Geifman et al., 2019), Deep Gamblers (Ziyin et al.), and Self-Adaptive Training (Huang et al., 2020) were followed, each of which is incorporated by reference.

The Imagenet-based datasets used a ResNet34 architecture for Deep Gamblers, Self-Adaptive Training, and used the main body block of SelectiveNet. For Deep Gamblers and Self-Adaptive Training, an additional class logit is added as a last layer as described in their methodology. The models were trained for 500 epochs using ADAM with a mini-batch size of 64. The learning rate was reduced by 0.5 every 25 epochs. The original papers were followed in regards to all other hyperparameters. SelectiveNet was trained with a target coverage rate and evaluated on the same coverage rate, following Geifman et al., 2019. As a result, there are different models for each experimental coverage rate. In contrast, Deep Gamblers and Self-Adaptive Training do not require training with a target coverage rate, i.e. the results for different experimental coverages are computed with the same models. Following Ziyin et al. and Huang et al., 2020, Deep Gamblers and Self-Adaptive Training were pretrained using the cross-entropy loss for 150 epochs. For SelectiveNet, the selection head is a fully connected hidden layer with 512 neurons, batch normalization, and ReLU activations. The value of $\alpha$ was set to 0.5 and $\lambda$ was set to 32. In the experiments, SelectiveNet was trained with a target coverage rate and evaluated on the same coverage rate. In the experiments involving the entropy minimization loss function, the hyperparameter $\beta$ that controls the weight of the bonus is set to 0.01.

Initial Experimental Results

Tables 1, 2 and 3 summarize the results of the Self-Adaptive Training, Deep Gamblers, and SelectiveNet experiments, respectively. For a given coverage, the bolded result indicates the lowest selective risk (i.e. best result) and underlined result indicate the second lowest selective risk. In the initial experiments, all experiments were run with 3 seeds.

TABLE 1

Self-Adaptive Training Results for CIFAR-10 and Imagenet100.

| Dataset | Coverage | Self-Adaptive Training: SAT | Self-Adaptive Training: SAT + Entropy | Self-Adaptive Training: SAT + SR |
|---|---|---|---|---|
| CIFAR-10 | 100 | **5.91 ± 0.04** | **5.91 ± 0.04** | **5.91 ± 0.04** |
| | 95 | 3.73 ± 0.13 | **3.59 ± 0.06** | 3.63 ± 0.10 |
| | 90 | 2.18 ± 0.11 | 2.12 ± 0.06 | **2.11 ± 0.06** |
| | 85 | 1.26 ± 0.09 | **1.18 ± 0.08** | **1.18 ± 0.07** |
| | 80 | 0.69 ± 0.04 | **0.63 ± 0.03** | 0.64 ± 0.04 |
| | 75 | 0.37 ± 0.01 | **0.35 ± 0.03** | 0.36 ± 0.03 |
| | 70 | 0.27 ± 0.02 | **0.23 ± 0.05** | **0.23 ± 0.05** |
| Imagenet100 | 100 | **13.58 ± 0.30** | **13.58 ± 0.30** | **13.58 ± 0.30** |
| | 90 | 8.80 ± 0.41 | 8.92 ± 0.43 | **8.04 ± 0.25** |
| | 80 | 5.20 ± 0.29 | 4.86 ± 0.22 | **4.46 ± 0.13** |
| | 70 | 2.71 ± 0.29 | 2.52 ± 0.23 | **2.33 ± 0.19** |
| | 60 | 1.72 ± 0.11 | 1.54 ± 0.15 | **1.37 ± 0.12** |
| | 50 | 1.18 ± 0.14 | 1.03 ± 0.12 | **0.88 ± 0.07** |
| | 40 | 0.82 ± 0.06 | 0.77 ± 0.07 | **0.60 ± 0.11** |
| | 30 | 0.67 ± 0.06 | **0.56 ± 0.08** | 0.59 ± 0.11 |
| | 20 | 0.48 ± 0.18 | **0.40 ± 0.18** | 0.46 ± 0.22 |
| | 10 | 0.32 ± 0.10 | 0.32 ± 0.10 | **0.12 ± 0.16** |

TABLE 2

Deep Gamblers Results for CIFAR-10 and Imagenet100.

| Dataset | Coverage | Deep Gamblers | Deep Gamblers + Entropy | Deep Gamblers + SR |
|---|---|---|---|---|
| CIFAR-10 | 100 | **6.08 ± 0.00** | **6.08 ± 0.00** | **6.08 ± 0.00** |
| | 95 | **3.71 ± 0.00** | 3.79 ± 0.00 | 3.81 ± 0.00 |
| | 90 | 2.27 ± 0.00 | **2.14 ± 0.00** | 2.16 ± 0.00 |
| | 85 | **1.29 ± 0.00** | 1.31 ± 0.00 | 1.35 ± 0.00 |
| | 80 | **0.81 ± 0.00** | 0.84 ± 0.00 | 0.85 ± 0.00 |
| | 75 | **0.44 ± 0.00** | 0.57 ± 0.00 | 0.56 ± 0.00 |
| | 70 | **0.30 ± 0.00** | 0.41 ± 0.00 | 0.43 ± 0.00 |
| Imagenet100 | 100 | **13.49 ± 0.52** | **13.49 ± 0.52** | **13.49 ± 0.52** |
| | 90 | 8.42 ± 0.44 | 8.25 ± 0.43 | **8.11 ± 0.48** |
| | 80 | 5.21 ± 0.32 | 4.76 ± 0.37 | **4.52 ± 0.38** |
| | 70 | 3.30 ± 0.40 | 2.70 ± 0.21 | **2.58 ± 0.21** |
| | 60 | 2.14 ± 0.37 | 1.86 ± 0.32 | **1.71 ± 0.32** |
| | 50 | 1.55 ± 0.27 | 1.35 ± 0.25 | **1.31 ± 0.22** |
| | 40 | 1.23 ± 0.38 | 1.20 ± 0.11 | **1.07 ± 0.19** |
| | 30 | 1.09 ± 0.31 | 1.00 ± 0.19 | **0.96 ± 0.21** |
| | 20 | 1.03 ± 0.31 | 0.97 ± 0.21 | **0.90 ± 0.22** |
| | 10 | 0.80 ± 0.28 | 0.73 ± 0.25 | **0.53 ± 0.25** |

TABLE 3

SelectiveNet Results for CIFAR-10 and Imagenet100. The model is trained on and evaluated on the same coverage.

| Dataset | Coverage | SelectiveNet | SelectiveNet + Entropy | SelectiveNet + SR |
|---|---|---|---|---|
| CIFAR-10 | 100 | **6.470 ± 0.002** | **6.470 ± 0.002** | **6.470 ± 0.002** |
| | 95 | 4.067 ± 0.001 | **4.018 ± 0.001** | 4.047 ± 0.001 |
| | 90 | 2.492 ± 0.001 | 2.494 ± 0.001 | **2.489 ± 0.001** |
| | 85 | 1.420 ± 0.001 | **1.413 ± 0.001** | 1.427 ± 0.001 |
| | 80 | 0.861 ± 0.001 | 0.873 ± 0.000 | **0.857 ± 0.001** |
| | 75 | **0.533 ± 0.001** | **0.533 ± 0.000** | 0.537 ± 0.001 |
| | 70 | **0.418 ± 0.000** | 0.467 ± 0.001 | 0.467 ± 0.001 |
| Imagenet100 | 100 | **13.77 ± 0.14** | **13.77 ± 0.14** | **13.77 ± 0.14** |
| | 90 | 9.44 ± 0.28 | 8.31 ± 0.21 | **7.89 ± 0.10** |
| | 80 | 6.00 ± 0.22 | 4.87 ± 0.28 | **4.47 ± 0.19** |
| | 70 | 3.38 ± 0.21 | 2.37 ± 0.30 | **2.21 ± 0.37** |
| | 60 | 1.99 ± 0.15 | 1.63 ± 0.07 | **1.57 ± 0.06** |
| | 50 | 1.05 ± 0.17 | 0.89 ± 0.06 | **0.85 ± 0.02** |
| | 40 | 0.58 ± 0.08 | 0.62 ± 0.13 | **0.53 ± 0.03** |

TABLE 3-continued

SelectiveNet Results for CIFAR-10 and Imagenet100. The model is trained on and evaluated on the same coverage.

| Dataset | Coverage | SelectiveNet | SelectiveNet + Entropy | SelectiveNet + SR |
|---|---|---|---|---|
| | 30 | 1.04 ± 0.37 | 0.69 ± 0.17 | **0.64 ± 0.10** |
| | 20 | 48.87 ± 6.15 | **46.97 ± 5.29** | 47.10 ± 3.83 |
| | 10 | **99.00 ± 0.00** | **99.00 ± 0.00** | **99.00 ± 0.00** |

CIFAR-10 Results

This experiment seeks to replicate the previously published results and compare their performances according to various selection mechanisms. In particular, in the experiments, Self-Adaptive Training's results at coverages of 100, 90, 80, 75, and 70 were better than reported in the paper. In contrast, the results for coverages 95 and 85 were worse. For Deep Gamblers, in experiments, the method performed better for coverages of 100, 90, 75, and 70. The method performed worse than reported on coverages of 95, 85, and 80. For SelectiveNet, in the experiments, the method performed better for coverages of 100, 95, and 85. It performed worse for coverages of 90, 80, 75, and 70.

The results comparing the selection mechanisms of the present disclosure to the original selection mechanisms show that selection mechanisms using entropy and Softmax Response perform similarly to the original selection mechanisms for SelectiveNet. The results for Deep Gamblers show a marginal decrease in performance for CIFAR-10, although this is offset by improved scalability; there is a significant improvement in performance when applied to more difficult datasets such as Imagenet100 and ImagenetSubset, as described below. However, for Self-Adaptive Training, using entropy or Softmax Response as a selection mechanism outperforms selecting via the abstention logit. Huang et al., 2020 report that Self-Adaptive Training is the state-of-the-art method for selective classification. As a result, Self-Adaptive Training with entropy as the selection mechanism represents a demonstrable improvement over the previous state-of-the-art.

Imagenet100 Results

Consistent with previous work by Huang et al., 2020, Self-Adaptive Training consistently outperforms Deep Gamblers and SelectiveNet on all coverages. Of note, SelectiveNet outperforms Deep Gamblers for moderate coverages (60, 50, and 40). At low coverages (30%, 20%, and 10%), SelectiveNet's performance progressively worsens. Without being limited by theory, it is hypothesized that this is due to the optimization process of SelectiveNet that allows the model to disregard (i.e. assign lower weight to their loss) a vast majority of samples during training at little cost, i.e., $\overline{g}(x)\approx 0$, especially when the target coverage is low such as 10%. In contrast, Deep Gamblers and Self-Adaptive Training encourage the respective model to make predictions on all samples if the model is confident since the action of abstaining also incurs a loss. This has not been seen in previous work, which has generally focused on very high coverages (above 70%) and small datasets. Across all the methods, it can be seen that selecting via entropy or Softmax Response outperforms the prior art selection mechanism by a significant margin.

ImagenetSubset Results

In this experiment, all the models were evaluated on 70% coverage. For the SelectiveNet experiments, the training target coverage was specified to be the same as the evaluation coverage (i.e. 70% in this case) as done in previous work (Geifman et al., 2017). Self-Adaptive Training consistently performs the best amongst the different methods. Furthermore, the model performs relatively better as the number of classes increase, suggesting that it is more scalable. Consistent with the other experiments, the use of entropy or Softmax Response as selection mechanisms consistently improves upon the original (prior art) selection mechanisms.

Figure 5:
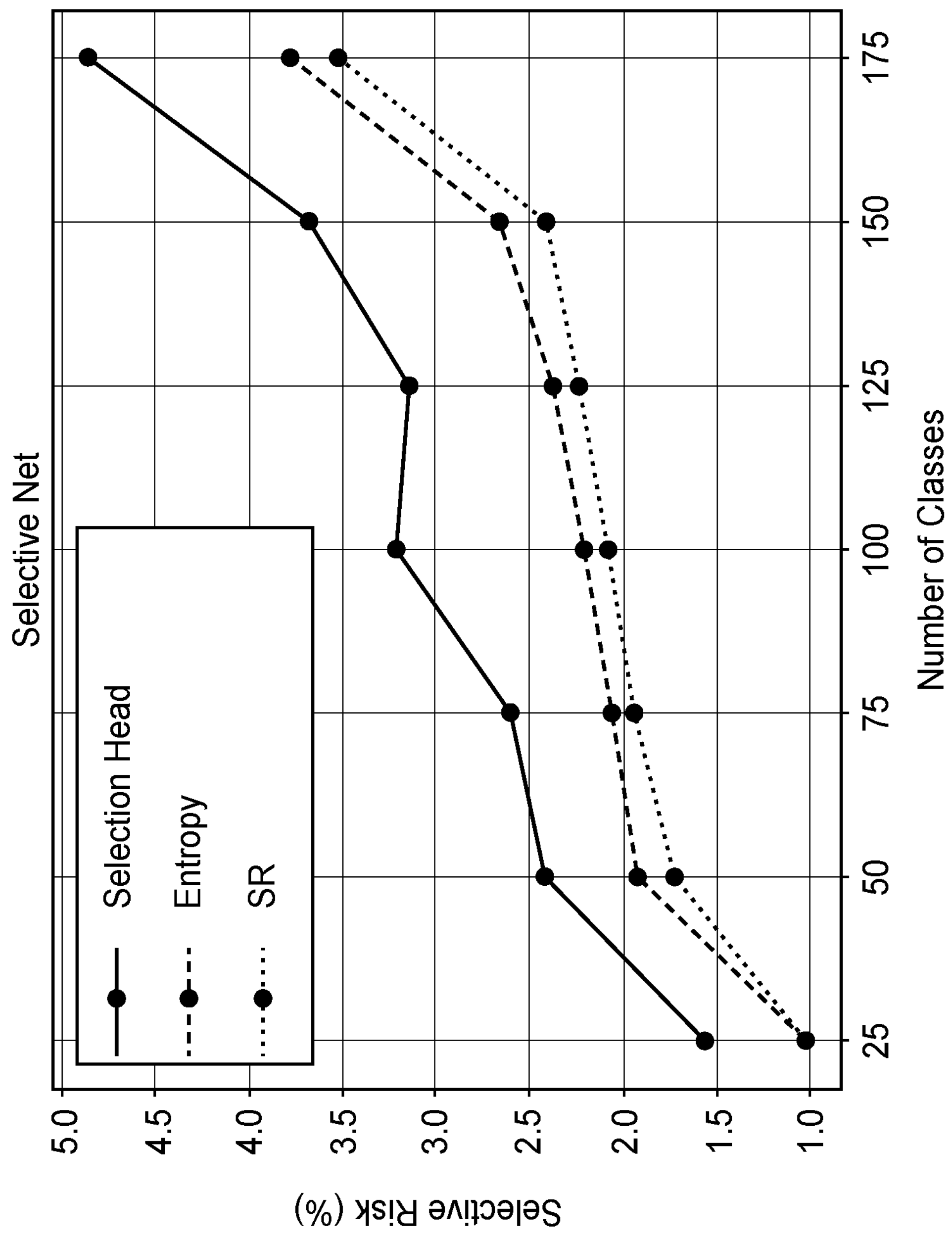
FIG. 5 shows a plot of selective risk against number of classes for SelectiveNet at test coverage of 70% for the ImagenetSubset dataset (as defined herein) using each of a selection head, entropy and Softmax Response as a selection mechanism.

In the experiments, it can be seen that SelectiveNet struggles to scale to more difficult tasks where the number of classes is a metric of difficulty. Although the percentage improvement stays relatively constant for various numbers of classes, the raw difference in selective accuracy significantly increases as the number of classes increases. This suggests that the use of entropy or Softmax Response as selection mechanisms is more beneficial for SelectiveNet as the difficulty of the task increases, i.e. improves scalability. FIG. 5 shows a plot of selective risk against number of classes for SelectiveNet at test coverage of 70% for the ImagenetSubset.

Figure 6:
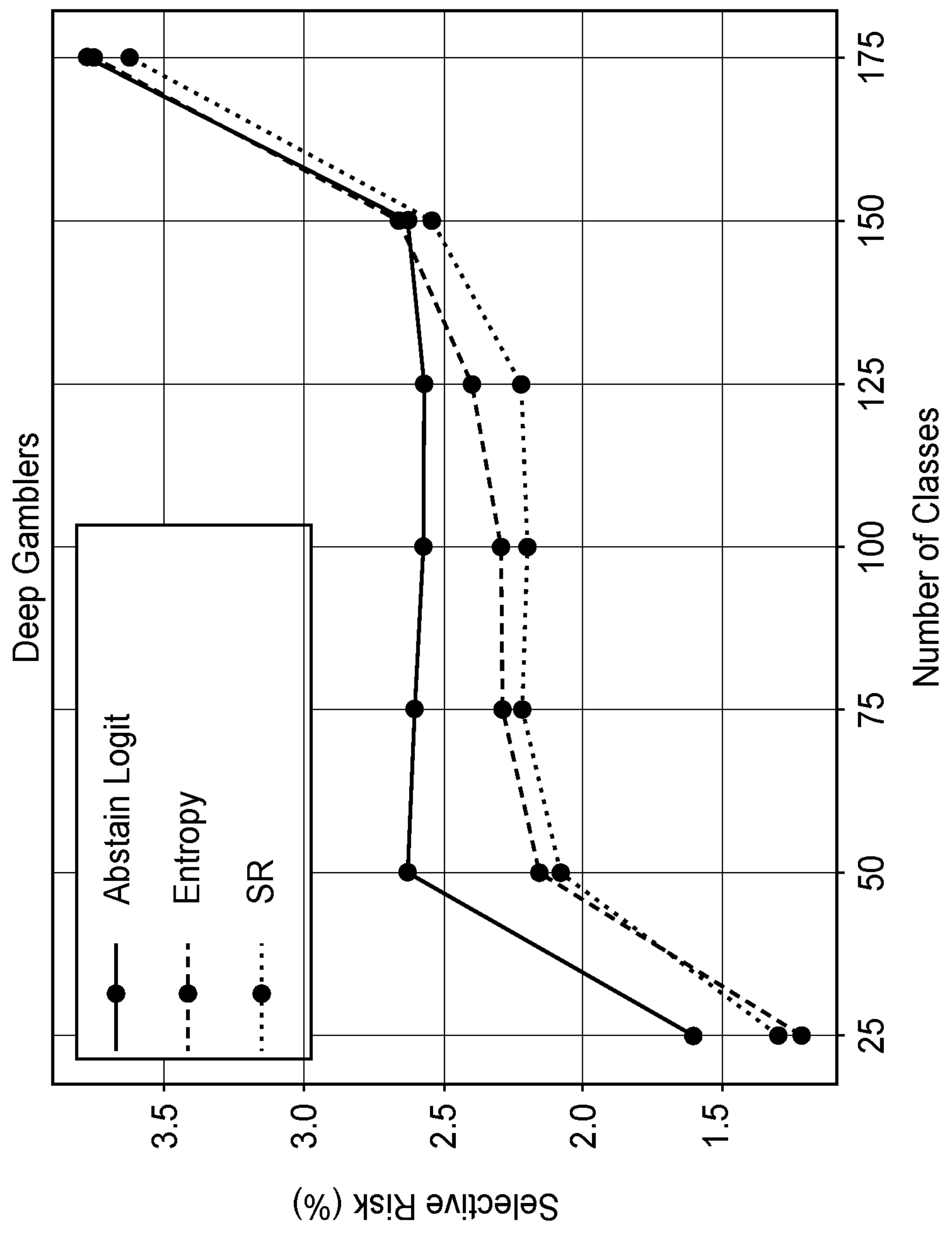
FIG. 6 shows a plot of selective risk against number of classes for Deep Gamblers at test coverage of 70% for the ImagenetSubset dataset (as defined herein) using each of an abstain logit, entropy and Softmax Response as a selection mechanism.
Figure 7:
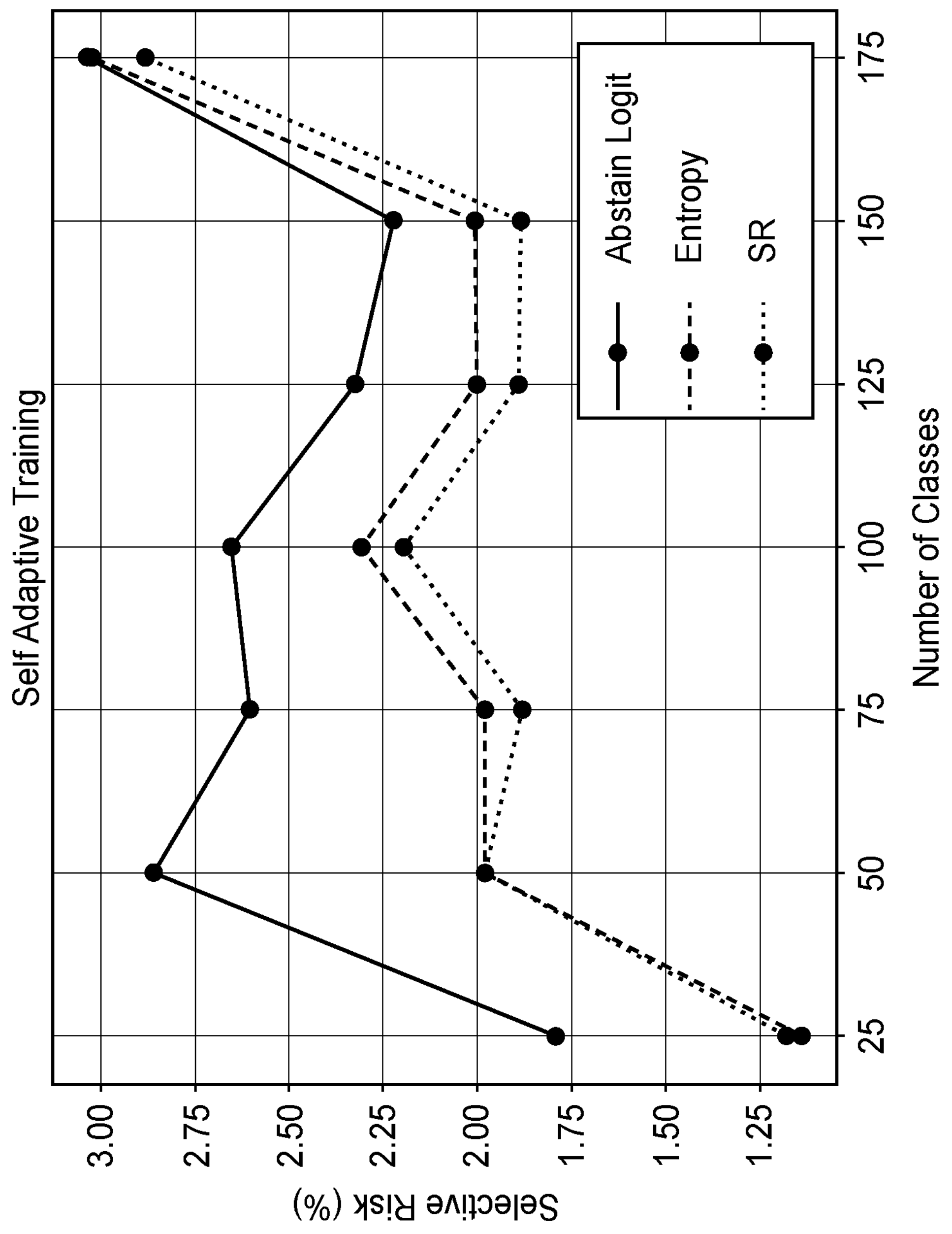
FIG. 7 shows a plot of selective risk against number of classes for Self-Adaptive Training at test coverage of 70% for the ImagenetSubset dataset (as defined herein) using each of an abstain logit, entropy and Softmax Response as a selection mechanism.
Figure 7A:
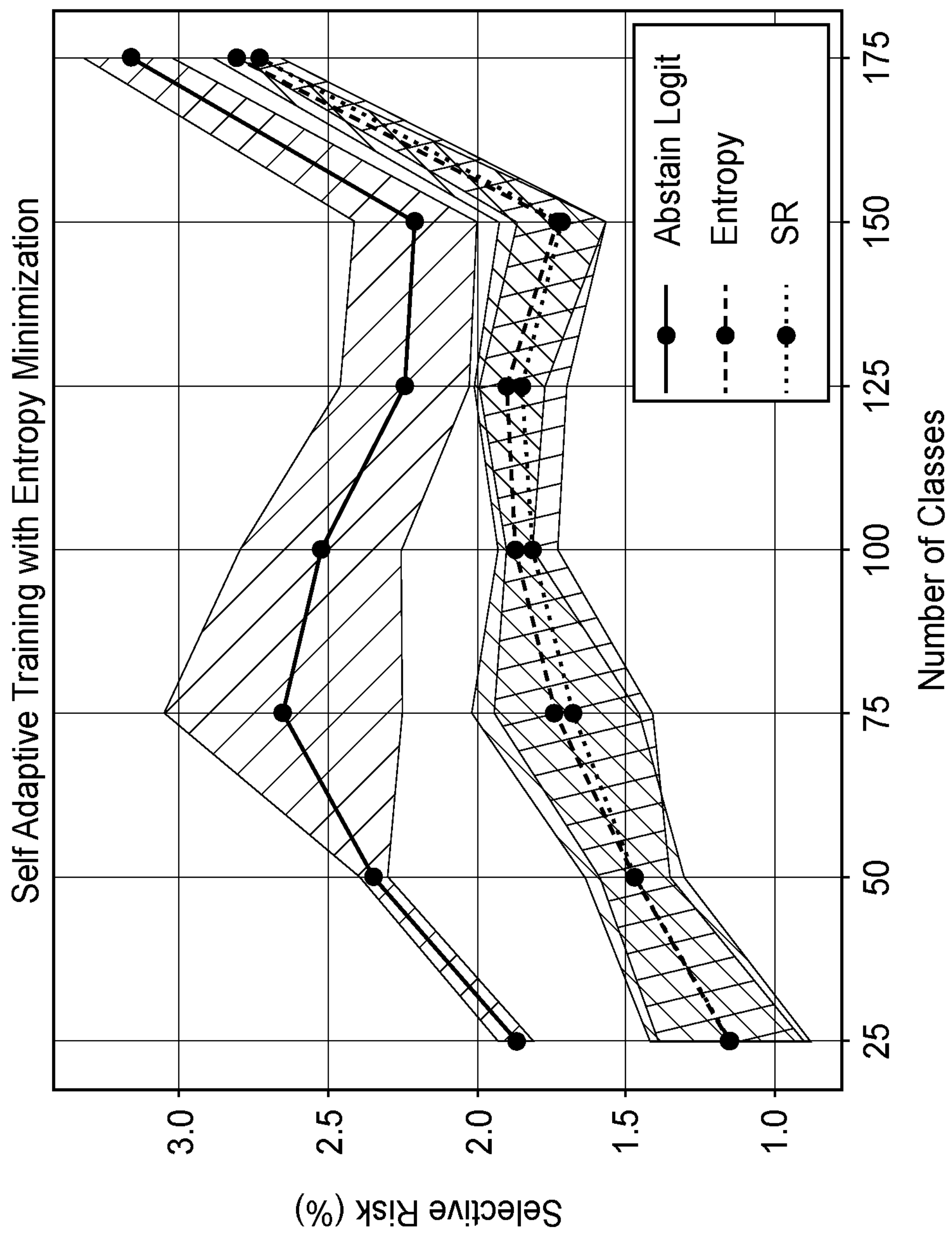
FIG. 7A shows a plot of selective risk against number of classes for Self-Adaptive Training with Entropy Minimization at test coverage of 70% for the ImagenetSubset dataset (as defined herein) using each of an abstain logit, entropy and Softmax Response as a selection mechanism.
Figure 8A:
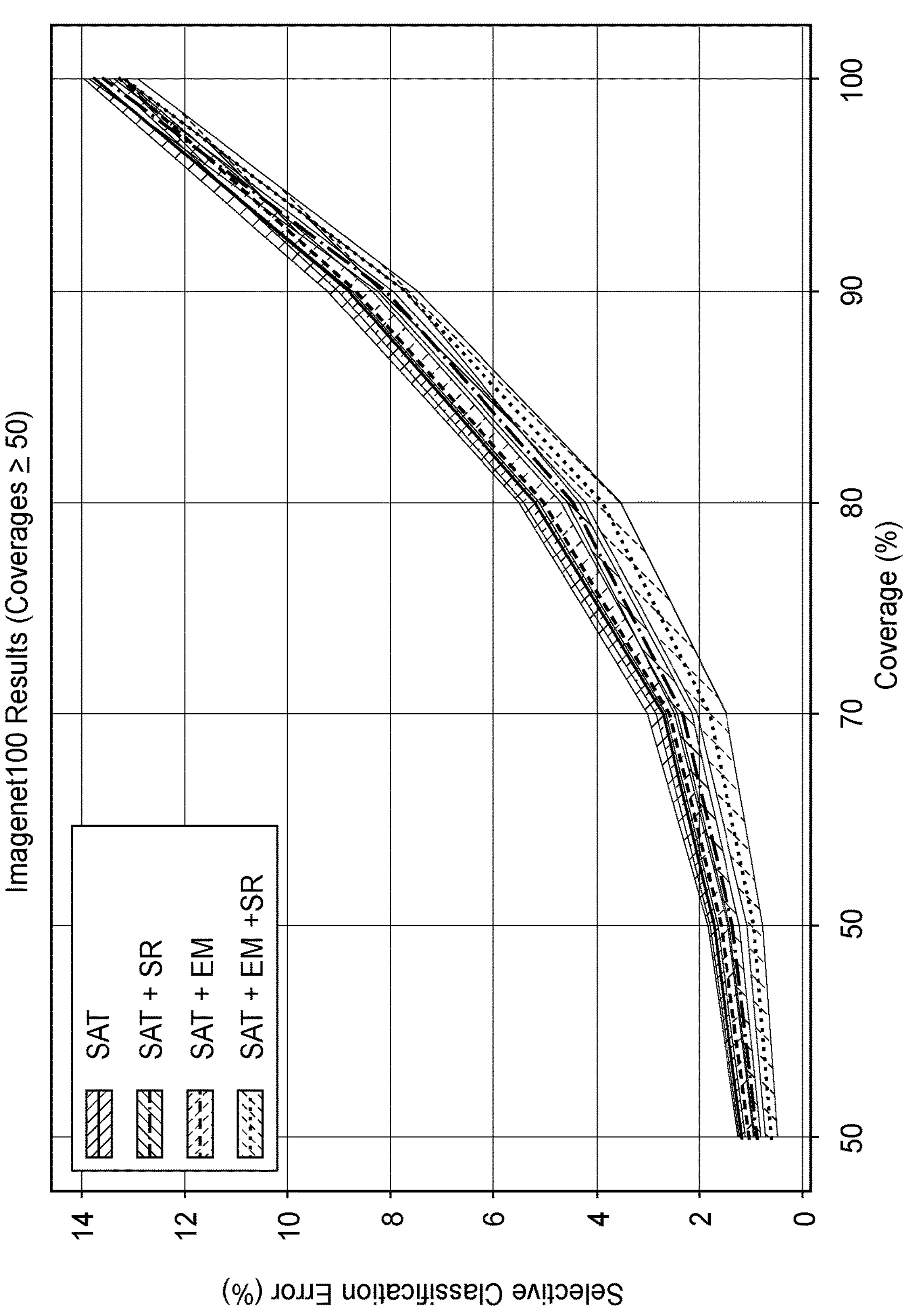
FIGS. 8A and 8B show risk coverage plots for Self-Adaptive Training (SAT), Self-Adaptive Training with Softmax Response (SAT+SR) and Self-Adaptive Training with entropy minimization in conjunction with the Softmax Response selection mechanism (SAT+EM+SR) for the Imagenet100 dataset (as defined herein)
Figure 8B:
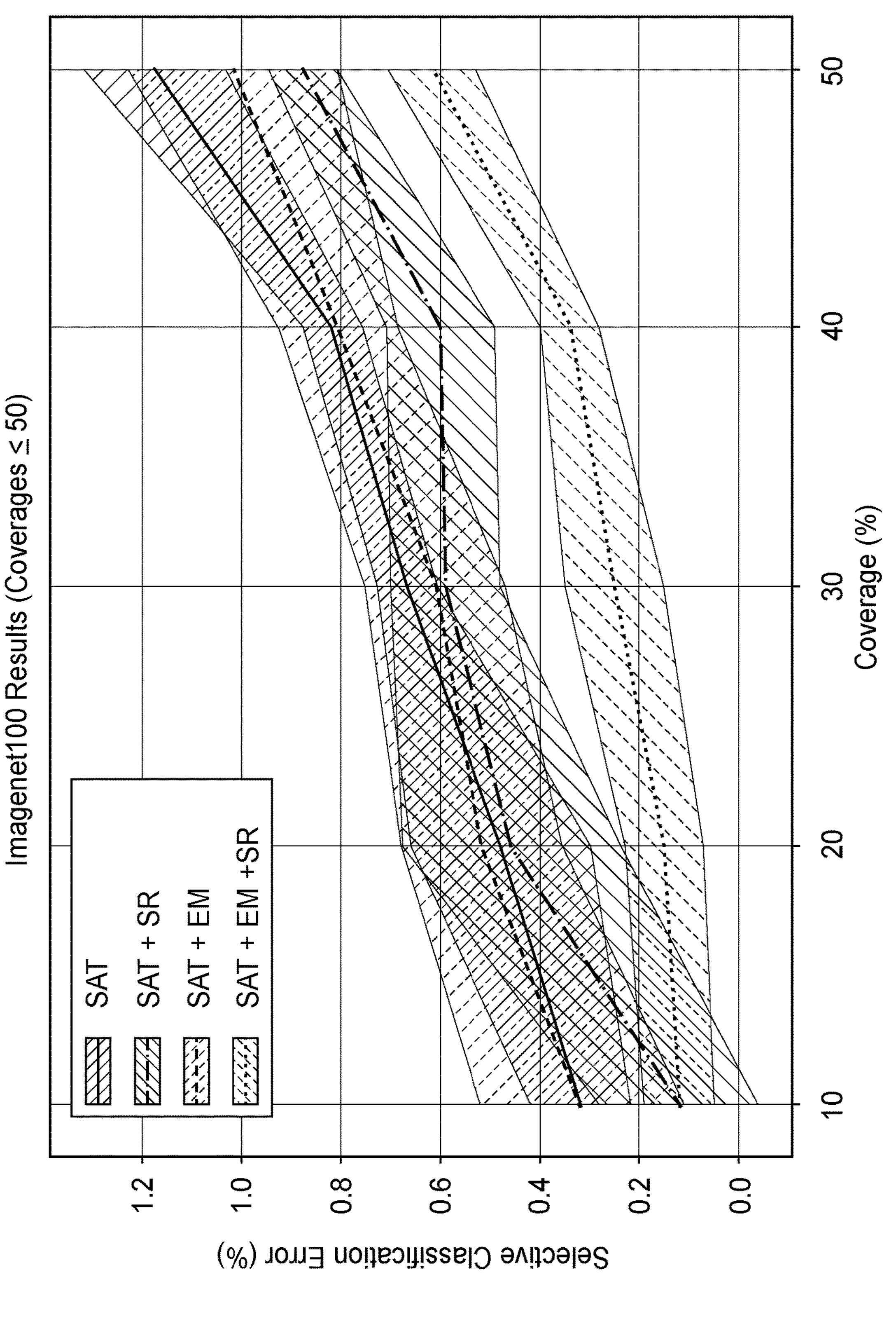
Figure 9A:
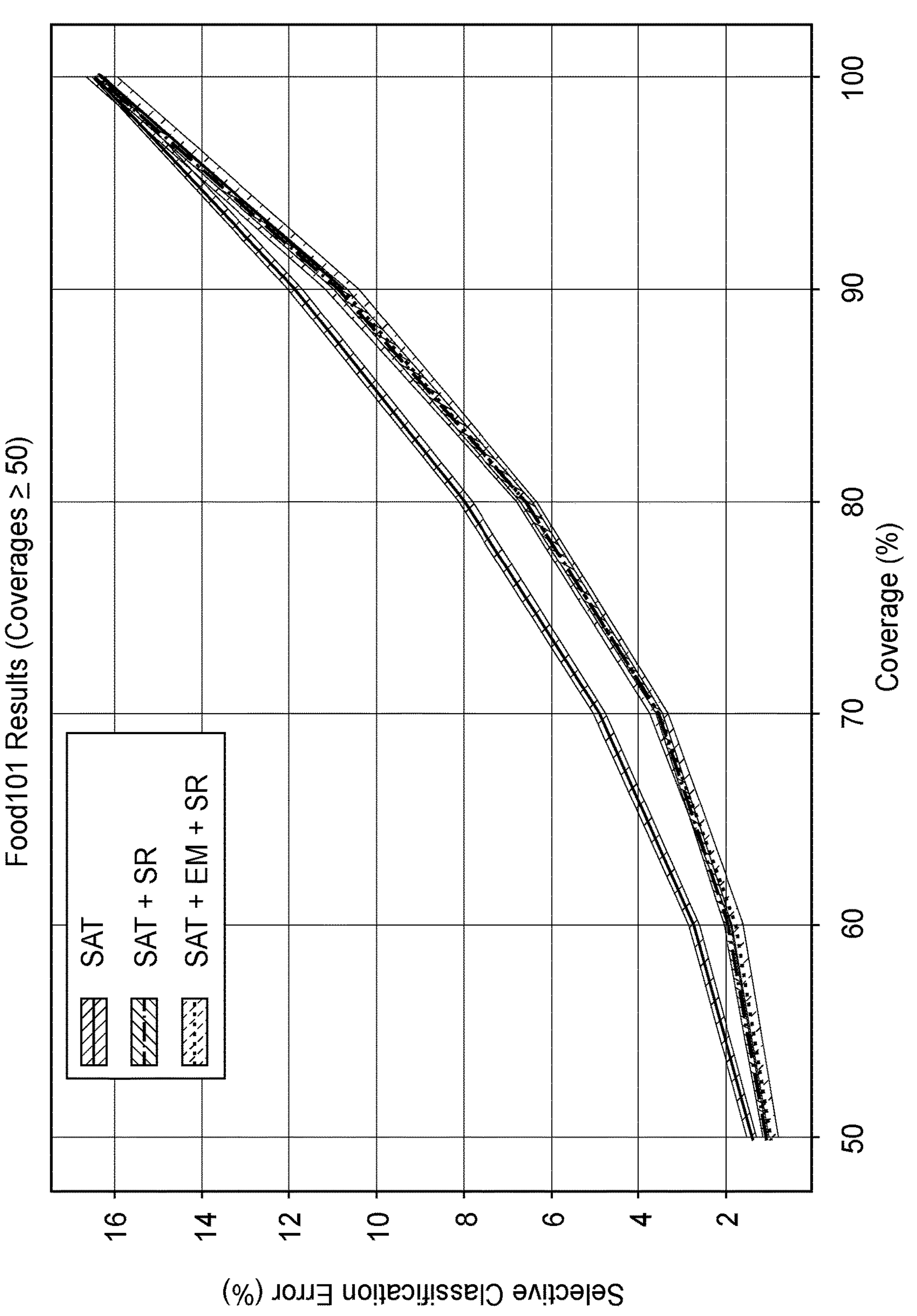
FIGS. 9A and 9B show risk coverage plots for Self-Adaptive Training (SAT), Self-Adaptive Training with Softmax Response (SAT+SR) and Self-Adaptive Training with entropy minimization in conjunction with the Softmax Response selection mechanism (SAT+EM+SR) for the Food101 dataset (as defined herein)
Figure 9B:
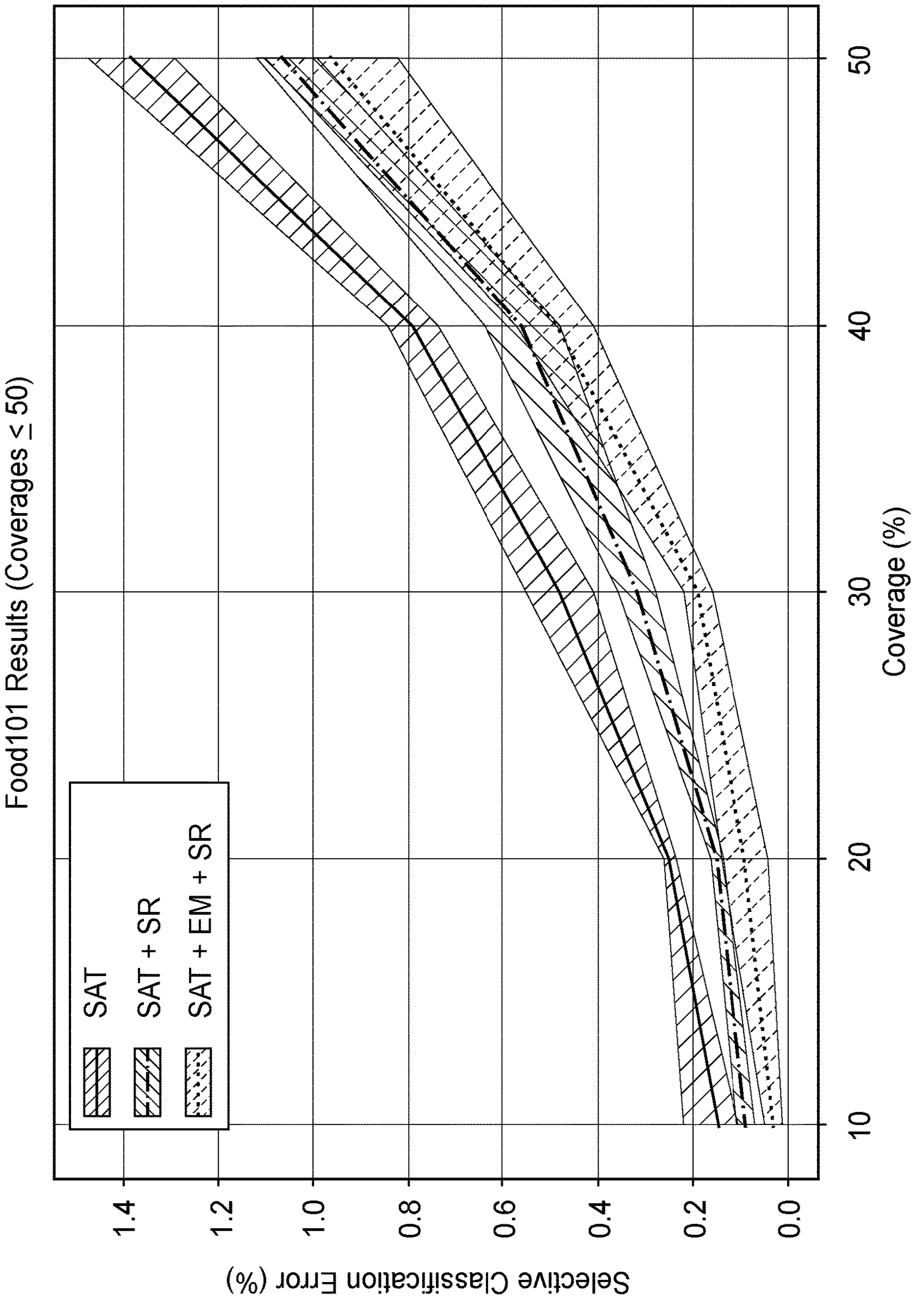
Figure 10A:
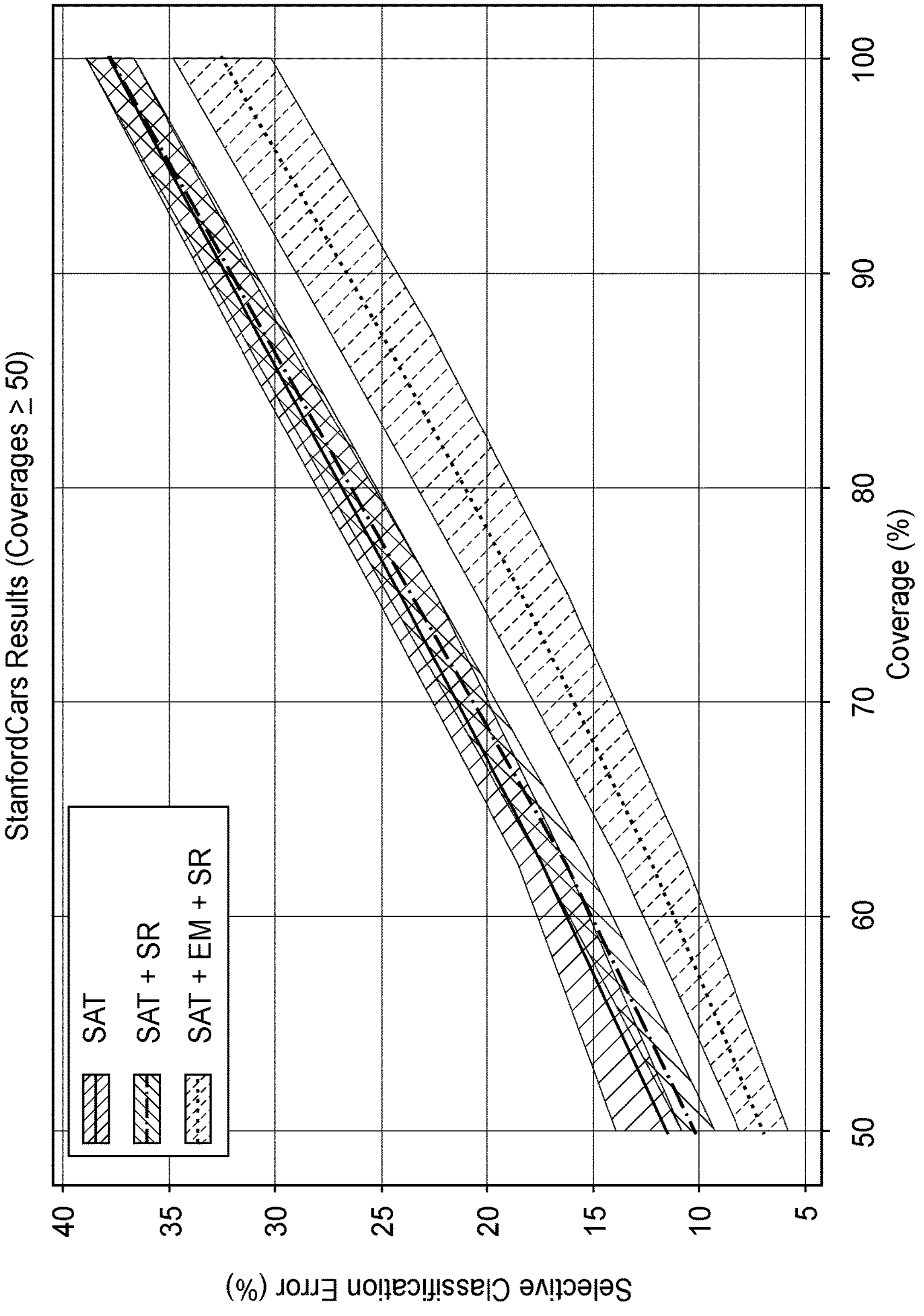
FIGS. 10A and 10B show risk coverage plots for Self-Adaptive Training (SAT), Self-Adaptive Training with Softmax Response (SAT+SR) and Self-Adaptive Training with entropy minimization in conjunction with the Softmax Response selection mechanism (SAT+EM+SR) for the StanfordCars dataset (as defined herein)
Figure 10B:
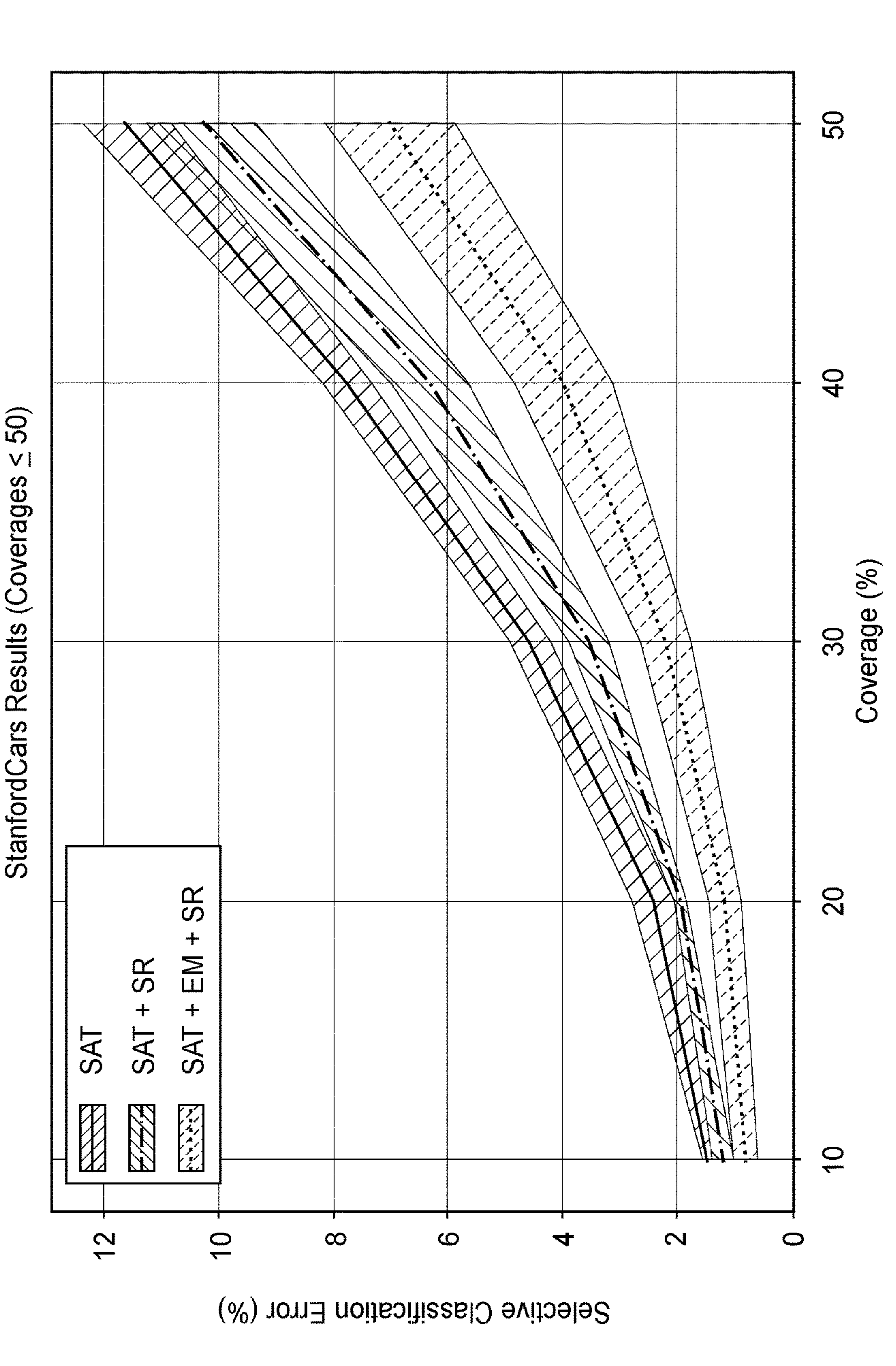

While selecting via Softmax Response or entropy provides a beneficial effect for Deep Gamblers and Self-Adaptive Training, both methods that learn an abstention logit, the magnitude of this beneficial effect decreases as the number of classes increases. FIG. 6 shows a plot of selective risk against number of classes for Deep Gamblers at test coverage of 70% for the ImagenetSubset, FIG. 7 shows a plot of selective risk against number of classes for Self-Adaptive Training at test coverage of 70% for the ImagenetSubset, and FIG. 7A shows a plot of selective risk against number of classes for Self-Adaptive Training with Entropy Minimization at test coverage of 70% for the ImagenetSubset.

In FIGS. 5 to 7A, it can be seen that both of the selection mechanisms based on the classifier itself (predictive entropy and Softmax Response) significantly outperform the original selection mechanisms. These results further support the conclusion that the strong performance of these methods was due to them learning a more generalizable model and the selection mechanism should stem from the classifier itself rather than a separate head/logit. Similarly, Softmax Response is preferred, relative to entropy, although both approaches provide improvement.

Thus, the performance of both Deep Gamblers and Self-Adaptive Training using Softmax Response or entropy as a selection mechanism improves, although the improvement decreases as the number of classes increases. In contrast, SelectiveNet's improvement when using Softmax Response or entropy as a selection mechanism increases as the number of classes increases. Since SelectiveNet struggles to scale to harder tasks and the improvement in selective accuracy with Softmax Response (SR) increases as the number of classes increases, this suggests that the proposed selection mechanism is more beneficial for SelectiveNet as the difficulty of the task increases, i.e., improves scalability.

TABLE 4

SelectiveNet Results on ImagenetSubset.

| Dataset | # of Classes | SelectiveNet | Selective-Net + Entropy | Selective-Net + SR |
|---|---|---|---|---|
| ImagenetSubset | 175 | **4.86 ± 0.38** | **3.78 ± 0.21** | **3.52 ± 0.16** |
| | 150 | 3.68 ± 0.27 | 2.66 ± 0.25 | **2.42 ± 0.21** |
| | 125 | 3.14 ± 0.22 | 2.37 ± 0.36 | **2.24 ± 0.42** |
| | 100 | 3.21 ± 0.19 | 2.20 ± 0.20 | **2.09 ± 0.13** |

TABLE 4-continued

SelectiveNet Results on ImagenetSubset.

| Dataset | # of Classes | SelectiveNet | Selective-Net + Entropy | Selective-Net + SR |
|---|---|---|---|---|
| | 75 | 2.60 ± 0.12 | 2.06 ± 0.23 | **1.94 ± 0.17** |
| | 50 | 2.42 ± 0.07 | 1.92 ± 0.03 | **1.73 ± 0.03** |
| | 25 | 1.56 ± 0.13 | 1.03 ± 0.23 | **1.03 ± 0.23** |

SelectiveNet models are trained on and evaluated on 70% coverage.

TABLE 5

Self-Adaptive Training Results on ImagenetSubset.

| Dataset | # of Classes | SAT | SAT + Entropy | SAT + SR |
|---|---|---|---|---|
| ImagenetSubset | 175 | 3.03 ± 0.13 | 3.01 ± 0.09 | **2.88 ± 0.15** |
| | 150 | 2.23 ± 0.16 | 2.01 ± 0.07 | **1.89 ± 0.15** |
| | 125 | 2.32 ± 0.25 | 2.00 ± 0.19 | **1.89 ± 0.16** |
| | 100 | 2.65 ± 0.19 | 2.30 ± 0.27 | **2.19 ± 0.26** |
| | 75 | 2.60 ± 0.15 | 1.98 ± 0.14 | **1.88 ± 0.19** |
| | 50 | 2.86 ± 0.34 | **1.98 ± 0.24** | **1.98 ± 0.27** |
| | 25 | 1.79 ± 0.53 | **1.14 ± 0.19** | 1.18 ± 0.11 |

The models are evaluated on 70% coverage.

TABLE 6

Deep Gamblers Results on ImagenetSubset.

| Dataset | # of Classes | Deep Gamblers | Deep Gamblers + Entropy | Deep Gamblers + SR |
|---|---|---|---|---|
| ImagenetSubset | 175 | 3.77 ± 0.10 | 3.75 ± 0.14 | **3.62 ± 0.11** |
| | 150 | 2.62 ± 0.03 | 2.65 ± 0.26 | **2.54 ± 0.24** |

TABLE 6-continued

Deep Gamblers Results on ImagenetSubset.

| Dataset | # of Classes | Deep Gamblers | Deep Gamblers + Entropy | Deep Gamblers + SR |
|---|---|---|---|---|
| | 125 | 2.58 ± 0.25 | 2.40 ± 0.19 | **2.22 ± 0.17** |
| | 100 | 2.57 ± 0.04 | 2.30 ± 0.01 | **2.20 ± 0.04** |
| | 75 | 2.60 ± 0.20 | 2.29 ± 0.00 | **2.22 ± 0.05** |
| | 50 | 2.63 ± 0.12 | 2.15 ± 0.05 | **2.08 ± 0.07** |
| | 25 | 1.60 ± 0.28 | **1.22 ± 0.30** | 1.30 ± 0.19 |

The models are evaluated on 70% coverage.

Entropy-Minimization (Entropy-Regularized Loss Function) Results

This experiment evaluated the efficacy of the entropy-regularized loss function, that is, the modified loss function with the added entropy minimization term (described above in the context of the method 200A in FIG. 2A) in training a selective classifier. As shown in Table 7, training with the modified loss function with the added entropy minimization term (entropy minimization loss function) helps the model train a better classifier at 100% coverage. While the improvement in selecting according to the original selection mechanism and predictive entropy for various coverages is marginal, there is a clear and very significant improvement across all coverages when using the Softmax Response as the selection mechanism for Self-Adaptive Training trained with the modified loss function with the added entropy minimization term. Remarkably, very significant relative improvements are seen across all coverages, e.g., 62.5%, 68.8%, 62.7%, and 58.5% relative improvement at 10%, 20%, 30%, and 40% coverages respectively.

TABLE 7

Self-Adaptive Training with the entropy minimization loss function results on Imagenet100.

| Coverage | SAT | SAT + EM | SAT + E | SAT + EM + E | SAT + SR | SAT + EM + SR |
|---|---|---|---|---|---|---|
| 100 | 13.58 ± 0.30 | **13.18 ± 0.24** | 13.58 ± 0.30 | **13.18 ± 0.24** | 13.58 ± 0.30 | **13.18 ± 0.24** |
| 90 | 8.80 ± 0.41 | 8.69 ± 0.32 | 8.92 ± 0.43 | 8.72 ± 0.27 | 8.04 ± 0.25 | **7.73 ± 0.22** |
| 80 | 5.20 ± 0.29 | 5.03 ± 0.36 | 4.86 ± 0.22 | 4.65 ± 0.37 | 4.46 ± 0.13 | **3.90 ± 0.34** |
| 70 | 2.71 ± 0.29 | 2.61 ± 0.22 | 2.52 ± 0.23 | 2.35 ± 0.29 | 2.33 ± 0.19 | **1.81 ± 0.27** |
| 60 | 1.72 ± 0.11 | 1.59 ± 0.19 | 1.54 ± 0.15 | 1.44 ± 0.15 | 1.37 ± 0.12 | **0.95 ± 0.13** |
| 50 | 1.18 ± 0.14 | 1.02 ± 0.21 | 1.03 ± 0.12 | 0.94 ± 0.19 | 0.88 ± 0.07 | **0.62 ± 0.09** |
| 40 | 0.82 ± 0.06 | 0.81 ± 0.12 | 0.77 ± 0.07 | 0.78 ± 0.07 | 0.60 ± 0.11 | **0.34 ± 0.06** |
| 30 | 0.67 ± 0.06 | 0.61 ± 0.14 | 0.56 ± 0.08 | 0.60 ± 0.12 | 0.59 ± 0.11 | **0.25 ± 0.10** |
| 20 | 0.48 ± 0.18 | 0.52 ± 0.16 | 0.40 ± 0.18 | 0.48 ± 0.13 | 0.46 ± 0.22 | **0.15 ± 0.08** |
| 10 | 0.32 ± 0.10 | 0.32 ± 0.20 | 0.32 ± 0.10 | 0.32 ± 0.20 | **0.12 ± 0.16** | **0.12 ± 0.07** |

EM refers to training with the entropy minimization loss Function,

E refers to selecting according to predictive entropy, and

SR refers to selecting according to Softmax Response.

Thus, the present disclosure provides a theoretical justification for selecting datapoints according to the predictive entropy or the maximum predictive class logit (Softmax Response) for the selective classification problem setting. The present disclosure further demonstrates that improved performance (on CIFAR-10, Imagenet100, and Imagenet-Subset) may be achieved by replacing the existing (prior art) selection mechanisms for the top three methods for selective classifications (Self-Adaptive Training, Deep Gamblers, and SelectiveNet) with either maximum predictive class logit or predictive entropy. Self-Adaptive Training modified according to the present disclosure to use Softmax Response as the selection mechanism improves over the state-of-the-art for selective classification. SelectiveNet modified according to the present disclosure has improved scalability.

The present disclosure also describes Imagenet100, a realistic non-saturated dataset (Tian et el.) based on Imagenet (Deng et al., Russakovsky et al.), useful for evaluating for low coverages (e.g. 10%) and another realistic dataset, ImagenetSubset, which is useful for evaluating scalability.

Additional Experiments

To further validate the methods described herein, additional experiments were performed to evaluate SelectiveNet, Self-Adaptive Training (SAT), and Deep Gamblers and compare the performance of these methods with the original selection mechanism and Softmax Response (SR).

Additional Datasets

In addition to the CIFAR-10, Imagenet100 and ImagenetSubset datasets described above, the following additional datasets were used in the additional experiments:

- Food101. This dataset is based on the Food dataset (Bossard et al., 2014) and contains 75750 training images and 25250 testing images split into 101 food categories.
- StanfordCars. The Cars dataset (Krause et al., 2013) contains 8,144 training images and 8,041 testing images split into 196 classes of cars. While conventional works typically evaluate StanfordCars for transfer learning, for the present disclosure the models are trained from scratch.
- Imagenet. This dataset (Deng et al., 2009) comprises 1300 images per class and evaluation data comprising 50,000 images split into 1,000 classes (see e.g. https://www.image-net.org/).

Implementation of Additional Experiments

For the additional experiments, the publicly available official implementations of Deep Gamblers and Self-Adaptive Training were adapted. Additional experiments on SelectiveNet were conducted with a Pytorch implementation of the method which follows the details provided in the original paper (Geifman et al., 2019). For the StanfordCars, Food101, Imagenet100, and ImagenetSubset datasets, a ResNet34 architecture was used for Deep Gamblers, Self-Adaptive Training, and the main body block of SelectiveNet. A VGG16 architecture was used for the additional CIFAR-10 experiments.

The entropy minimization loss function hyperparameter was tuned with the following values: $\beta \in \{0.1, 0.01, 0.001, 0.0001\}$. The additional CIFAR-10 experiments, and the Food101 and StanfordCars experiments, were run with 5 seeds. The additional Imagenet-related experiments were run with 3 seeds.

SelectiveNet was trained with a target coverage rate and evaluated on the same coverage rate. As a result, there are different models for each experimental coverage rate. In contrast, target coverage does not play a role in the optimization process of Deep Gamblers and Self-Adaptive Training, hence, the results for different experimental coverages are computed with the same models.

For hyperparameter tuning, Imagenet100's training data was divided into 80% training data and 20% validation data evenly across the different classes. The following values were tested for the entropy minimization coefficient $\beta \in \{0.1, 0.01, 0.001, 0.0001\}$. For the final evaluation, the model was trained on the entire training data.

For the additional experiments, Self-Adaptive Training models were trained using SGD with an initial learning rate of 0.1 and a momentum of 0.9.

For the additional experiments, the training epochs were as follows:

- Food101/Imagenet100/ImagenetSubset. The models were trained for 500 epochs with a mini-batch size of 128. The learning rate was reduced by 0.5 every 25 epochs. The entropy-minimization term was $\beta=0.01$.
- CIFAR-10. The models were trained for 300 epochs with a mini-batch size of 64. The learning rate was reduced by 0.5 every 25 epochs. The entropy-minimization term was $\beta=0.001$.
- StanfordCars. The models were trained for 300 epochs with a mini-batch size of 64. The learning rate was reduced by 0.5 every 25 epochs. The entropy-minimization term was $\beta=0.01$.
- Imagenet. The models were trained for 150 epochs with a mini-batch size of 256. The learning rate was reduced by 0.5 every 10 epochs. The entropy-minimization term was $\beta=0.001$.

Additional Experimental Results

Additional Self-Adaptive Training Results

Tables 8, 9, and 10 compare Self-Adaptive Training (SAT), Self-Adaptive Training with Softmax Response (SAT+SR), and Self-Adaptive Training with Entropy-Minimization and Softmax Response (SAT+EM+SR). Table 8 provides a comparison for the StanfordCars and Food101 datasets, Table 9 provides a comparison for the Imagenet dataset, and Table 10 provides a comparison for the CIFAR-10 dataset.

TABLE 8

Comparison of the selective classification error between Self-Adaptive Training (SAT) with the original selection mechanisms vs. using Softmax Response (SR) and the proposed entropy minimization loss function (EM) on StanfordCars and Food101

| | StanfordCars | | | Food101 | | |
|---|---|---|---|---|---|---|
| Cov. | SAT | SAT + SR | SAT + EM + SR | SAT | SAT + SR | SAT + EM + SR |
| 100 | 37.68 ± 1.11 | 37.68 ± 1.11 | **32.49 ± 2.33** | **16.41 ± 0.10** | **16.41 ± 0.10** | **16.32 ± 0.35** |
| 90 | 32.34 ± 1.19 | 32.04 ± 1.18 | **26.60 ± 2.39** | 11.87 ± 0.13 | 10.84 ± 0.17 | **10.77 ± 0.36** |
| 80 | 26.86 ± 1.15 | 26.39 ± 1.13 | **20.87 ± 2.33** | 7.99 ± 0.12 | **6.57 ± 0.13** | **6.57 ± 0.21** |
| 70 | 21.34 ± 1.20 | 20.70 ± 1.23 | **15.84 ± 1.98** | 4.89 ± 0.11 | **3.52 ± 0.05** | **3.52 ± 0.19** |

TABLE 8-continued

Comparison of the selective classification error between Self-Adaptive Training (SAT) with the original selection mechanisms vs. using Softmax Response (SR) and the proposed entropy minimization loss function (EM) on StanfordCars and Food101

| | StanfordCars | | | Food101 | | |
|---|---|---|---|---|---|---|
| Cov. | SAT | SAT + SR | SAT + EM + SR | SAT | SAT + SR | SAT + EM + SR |
| 60 | 16.21 ± 1.10 | 14.92 ± 1.03 | **11.09 ± 1.50** | 2.73 ± 0.09 | 1.95 ± 0.08 | **1.75 ± 0.17** |
| 50 | 11.59 ± 0.74 | 10.25 ± 0.97 | **7.00 ± 1.13** | 1.38 ± 0.09 | 1.06 ± 0.06 | **0.96 ± 0.14** |
| 40 | 7.76 ± 0.43 | 6.32 ± 0.69 | **4.00 ± 0.87** | 0.79 ± 0.05 | 0.56 ± 0.08 | **0.49 ± 0.08** |
| 30 | 4.56 ± 0.35 | 3.54 ± 0.36 | **2.20 ± 0.44** | 0.48 ± 0.07 | 0.32 ± 0.04 | **0.19 ± 0.03** |
| 20 | 2.42 ± 0.36 | 1.93 ± 0.09 | **1.17 ± 0.28** | 0.25 ± 0.01 | 0.15 ± 0.01 | **0.09 ± 0.05** |
| 10 | 1.49 ± 0.00 | 1.20 ± 0.21 | **0.80 ± 0.22** | 0.15 ± 0.07 | 0.09 ± 0.02 | **0.03 ± 0.02** |

TABLE 9

Results on Imagenet and demonstration of the impact of the SAT + EM + SR method over using SR alone or EM alone. (The Imagenet100 results replicate those shown in Table 7)

| | Imagenet | | Imagenet100 | | | |
|---|---|---|---|---|---|---|
| Cov. | SAT | SAT + EM + SR | SAT | SAT + SR | SAT + EM | SAT + EM + SR |
| 100 | 27.41 ± 0.08 | **27.27 ± 0.05** | 13.58 ± 0.30 | 13.58 ± 0.30 | **13.18 ± 0.24** | **13.18 ± 0.24** |
| 90 | 22.67 ± 0.24 | **21.57 ± 0.19** | 8.80 ± 0.41 | 8.04 ± 0.25 | 8.69 ± 0.32 | **7.73 ± 0.22** |
| 80 | 18.14 ± 0.28 | **16.83 ± 0.06** | 5.20 ± 0.29 | 4.46 ± 0.13 | 5.03 ± 0.36 | **3.90 ± 0.34** |
| 70 | 13.88 ± 0.14 | **12.34 ± 0.11** | 2.71 ± 0.29 | 2.33 ± 0.19 | 2.61 ± 0.22 | **1.81 ± 0.27** |
| 60 | 10.11 ± 0.15 | **8.45 ± 0.05** | 1.72 ± 0.11 | 1.37 ± 0.12 | 1.59 ± 0.19 | **0.95 ± 0.13** |
| 50 | 6.82 ± 0.07 | **5.57 ± 0.17** | 1.18 ± 0.14 | 0.88 ± 0.07 | 1.02 ± 0.21 | **0.62 ± 0.09** |
| 40 | 4.32 ± 0.33 | **3.77 ± 0.00** | 0.82 ± 0.06 | 0.60 ± 0.11 | 0.81 ± 0.12 | **0.34 ± 0.06** |
| 30 | 2.68 ± 0.14 | **2.32 ± 0.15** | 0.67 ± 0.06 | 0.59 ± 0.11 | 0.61 ± 0.14 | **0.25 ± 0.10** |
| 20 | 1.82 ± 0.13 | **1.35 ± 0.20** | 0.48 ± 0.18 | 0.46 ± 0.22 | 0.52 ± 0.16 | **0.15 ± 0.08** |
| 10 | 1.27 ± 0.34 | **0.55 ± 0.05** | 0.32 ± 0.10 | **0.12 ± 0.16** | 0.32 ± 0.20 | **0.12 ± 0.07** |

Further, as part of the additional experiments, Self-Adaptive Training trained with the entropy-regularized loss function was evaluated for ImageSubset, as shown in Table 10 (where it is seen that SAT+EM+SR performs the best and outperforms SAT by a statistically significant margin) and Table 11:

TABLE 10

Self-Adaptive Training with Entropy Minimization Loss Function on ImagenetSubset at 70% coverage.

| | SAT | | SAT + Entropy | | SAT + Softmax Response | |
|---|---|---|---|---|---|---|
| # Classes | SAT | SAT + EM | SAT + E | SAT + EM + E | SAT + SR | SAT + EM + SR |
| 175 | 3.03 ± 0.13 | 3.16 ± 0.15 | 3.01 ± 0.09 | 2.80 ± 0.07 | 2.88 ± 0.15 | **2.73 ± 0.07** |
| 150 | 2.23 ± 0.16 | 2.20 ± 0.20 | 2.01 ± 0.07 | 1.73 ± 0.19 | 1.89 ± 0.15 | **1.71 ± 0.15** |
| 125 | 2.32 ± 0.25 | 2.24 ± 0.22 | 2.00 ± 0.19 | 1.90 ± 0.12 | 1.89 ± 0.16 | **1.84 ± 0.14** |
| 100 | 2.65 ± 0.19 | 2.52 ± 0.27 | 2.30 ± 0.27 | 1.87 ± 0.06 | 2.19 ± 0.26 | **1.81 ± 0.08** |
| 75 | 2.60 ± 0.15 | 2.65 ± 0.40 | 1.98 ± 0.14 | 1.73 ± 0.29 | 1.88 ± 0.19 | **1.68 ± 0.27** |
| 50 | 2.86 ± 0.34 | 2.34 ± 0.05 | 1.98 ± 0.24 | **1.47 ± 0.16** | 1.98 ± 0.27 | **1.47 ± 0.12** |
| 25 | 1.79 ± 0.53 | 1.87 ± 0.05 | **1.14 ± 0.19** | **1.14 ± 0.25** | 1.18 ± 0.11 | **1.14 ± 0.25** |

TABLE 11

ImagenetSubset Results

| | | # of | Self-Adaptive Training | |
|---|---|---|---|---|
| Dataset | Coverage | Classes | SAT | SAT + EM + SR |
| ImagenetSubset | 30 | 175 | 0.69 ± 0.12 | **0.46 ± 0.05** |
| | | 150 | 0.44 ± 0.13 | **0.16 ± 0.02** |
| | | 125 | 0.44 ± 0.07 | **0.14 ± 0.09** |
| | | 100 | 0.71 ± 0.11 | **0.15 ± 0.06** |
| | | 75 | 0.50 ± 0.15 | **0.09 ± 0.00** |

TABLE 11-continued

ImagenetSubset Results

| | | # of | Self-Adaptive Training | |
|---|---|---|---|---|
| Dataset | Coverage | Classes | SAT | SAT + EM + SR |
| | | 50 | 0.76 ± 0.06 | **0.16 ± 0.05** |
| | | 25 | 0.53 ± 0.00 | **0.08 ± 0.11** |
| | 40 | 175 | 0.94 ± 0.06 | **0.59 ± 0.14** |
| | | 150 | 0.64 ± 0.03 | **0.34 ± 0.06** |
| | | 125 | 0.76 ± 0.06 | **0.25 ± 0.04** |

TABLE 11-continued

ImagenetSubset Results

| Dataset | Coverage | # of Classes | Self-Adaptive Training SAT | SAT + EM + SR |
|---|---|---|---|---|
| | | 100 | 0.90 ± 0.15 | **0.30 ± 0.00** |
| | | 75 | 0.84 ± 0.14 | **0.23 ± 0.03** |
| | | 50 | 1.17 ± 0.39 | **0.27 ± 0.13** |
| | | 25 | 0.67 ± 0.25 | **0.07 ± 0.09** |
| | 50 | 175 | 1.27 ± 0.12 | **0.91 ± 0.16** |
| | | 150 | 0.81 ± 0.11 | **0.47 ± 0.05** |
| | | 125 | 0.93 ± 0.11 | **0.52 ± 0.07** |
| | | 100 | 1.11 ± 0.10 | **0.56 ± 0.06** |
| | | 75 | 1.01 ± 0.08 | **0.40 ± 0.03** |
| | | 50 | 1.44 ± 0.30 | **0.37 ± 0.10** |
| | | 25 | 0.64 ± 0.23 | **0.21 ± 0.08** |
| | 60 | 175 | 1.77 ± 0.12 | **1.44 ± 0.20** |
| | | 150 | 1.21 ± 0.10 | **0.87 ± 0.04** |
| | | 125 | 1.34 ± 0.17 | **0.95 ± 0.01** |
| | | 100 | 1.67 ± 0.07 | **0.93 ± 0.03** |
| | | 75 | 1.51 ± 0.18 | **0.78 ± 0.02** |
| | | 50 | 1.78 ± 0.16 | **0.69 ± 0.08** |
| | | 25 | 0.93 ± 0.19 | **0.49 ± 0.17** |
| | 70 | 175 | 3.03 ± 0.13 | **2.73 ± 0.07** |
| | | 150 | 2.23 ± 0.16 | **1.71 ± 0.15** |
| | | 125 | 2.32 ± 0.25 | **1.84 ± 0.14** |
| | | 100 | 2.65 ± 0.19 | **1.81 ± 0.08** |

TABLE 11-continued

ImagenetSubset Results

| Dataset | Coverage | # of Classes | Self-Adaptive Training SAT | SAT + EM + SR |
|---|---|---|---|---|
| | | 75 | 2.60 ± 0.15 | **1.68 ± 0.27** |
| | | 50 | 2.86 ± 0.34 | **1.47 ± 0.12** |
| | | 25 | 1.79 ± 0.53 | **1.14 ± 0.25** |
| | 80 | 175 | 5.85 ± 0.13 | **5.37 ± 0.15** |
| | | 150 | 4.46 ± 0.05 | **3.88 ± 0.19** |
| | | 125 | 4.78 ± 0.26 | **3.94 ± 0.34** |
| | | 100 | 4.94 ± 0.41 | **3.96 ± 0.02** |
| | | 75 | 4.91 ± 0.28 | **3.78 ± 0.35** |
| | | 50 | 5.05 ± 0.14 | **3.35 ± 0.36** |
| | | 25 | 4.13 ± 0.34 | **2.80 ± 0.16** |
| | 90 | 175 | 10.14 ± 0.32 | **9.69 ± 0.17** |
| | | 150 | 8.30 ± 0.20 | **8.08 ± 0.16** |
| | | 125 | 8.87 ± 0.04 | **8.18 ± 0.59** |
| | | 100 | 8.90 ± 0.54 | **8.18 ± 0.23** |
| | | 75 | 8.57 ± 0.44 | **7.78 ± 0.43** |
| | | 50 | 8.79 ± 0.17 | **6.96 ± 0.64** |
| | | 25 | 7.79 ± 0.43 | **6.84 ± 0.19** |

The results of the additional experiments for Self-Adaptive Training show that SAT+EM+SR achieves state-of-the-art performance across all coverages. For example, in StanfordCars (Table 8), at 70% coverage, there is a raw 5.5% absolute improvement (25% relative reduction) in selective classification error by using SAT+EM+SR. In Food101 (Table 8), at 70% coverage, there is a raw 1.37% absolute reduction (28% relative reduction) in selective classification error. There is clear and considerable improvement across all coverages when using the Softmax Response selection mechanism rather than the original selection mechanism. These results further confirm the surprising and unexpected finding that existing selection mechanisms are suboptimal.

To evaluate the scalability of the proposed methodology with respect to the number of classes, the method of Self-Adaptive Training with entropy-regularized loss function and selecting according to Softmax Response (SAT+EM+SR) as described herein was compared with Self-Adaptive Training (SAT) on ImagenetSubset. In Table 12, Self-Adaptive Training with entropy-regularized loss function and selecting according to Softmax Response (SAT+EM+SR) outperforms standard Self-Adaptive Training (SAT) across all sizes of datasets.

TABLE 12

Comparison between the Selective classification error for Self-Adaptive Training (SAT) and SAT with Entropy Minimization (EM) and Softmax Response (SR) on ImagenetSubset.

| | 30% Coverage | | 50% Coverage | | 70% Coverage | |
|---|---|---|---|---|---|---|
| # Classes | SAT | SAT + EM + SR | SAT | SAT + EM + SR | SAT | SAT + EM + SR |
| 175 | 0.69 ± 0.12 | **0.46 ± 0.05** | 1.27 ± 0.12 | **0.91 ± 0.16** | 3.03 ± 0.13 | **2.73 ± 0.07** |
| 150 | 0.44 ± 0.13 | **0.16 ± 0.02** | 0.81 ± 0.11 | **0.47 ± 0.05** | 2.23 ± 0.16 | **1.71 ± 0.15** |
| 125 | 0.44 ± 0.07 | **0.14 ± 0.09** | 0.93 ± 0.11 | **0.52 ± 0.07** | 2.32 ± 0.25 | **1.84 ± 0.14** |
| 100 | 0.71 ± 0.11 | **0.15 ± 0.06** | 1.11 ± 0.10 | **0.56 ± 0.06** | 2.65 ± 0.19 | **1.81 ± 0.08** |
| 75 | 0.50 ± 0.15 | **0.09 ± 0.00** | 1.01 ± 0.08 | **0.40 ± 0.03** | 2.60 ± 0.15 | **1.68 ± 0.27** |
| 50 | 0.76 ± 0.06 | **0.16 ± 0.05** | 1.44 ± 0.30 | **0.37 ± 0.10** | 2.86 ± 0.34 | **1.47 ± 0.12** |
| 25 | 0.53 ± 0.00 | **0.08 ± 0.11** | 0.64 ± 0.23 | **0.21 ± 0.08** | 1.79 ± 0.53 | **1.14 ± 0.25** |

For the CIFAR-10 experiments (Table 13), the results for the different methods are within confidence intervals. Since the selective classification errors are very small, it is difficult to draw conclusions from such results. On CIFAR-10, Self-Adaptive Training (SAT) achieves 99+% accuracy at 80% coverage. In contrast, on Imagenet100, Self-Adaptive Training (SAT) achieves 95% accuracy at 80% coverage. The saturation of CIFAR-10 is noted.

TABLE 13

Results on CIFAR-10

| | CIFAR-10 | |
|---|---|---|
| Coverage | SAT | SAT + EM + SR |
| 100 | **5.91 ± 0.04** | **5.91 ± 0.04** |
| 95 | 3.73 ± 0.13 | **3.63 ± 0.10** |
| 90 | 2.18 ± 0.11 | **2.11 ± 0.06** |
| 85 | 1.26 ± 0.09 | **1.18 ± 0.07** |
| 80 | 0.69 ± 0.04 | **0.64 ± 0.04** |
| 75 | 0.37 ± 0.01 | **0.36 ± 0.03** |
| 70 | 0.27 ± 0.02 | **0.23 ± 0.05** |

Additional Deep Gambler Results

Table 14 shows the results for Deep Gamblers (DG), Deep Gamblers plus entropy and Deep Gamblers plus Softmax Response (DG+SR) for the CIFAR-10 and Imagenet100 datasets:

TABLE 14

Deep Gamblers Results on CIFAR-10 and Imagenet100.

| | | Deep Gamblers | | |
|---|---|---|---|---|
| Dataset | Coverage | DG | DG + Entropy | DG + SR |
| CIFAR-10 | 100 | **6.08 ± 0.00** | **6.08 ± 0.00** | **6.08 ± 0.00** |
| | 95 | **3.71 ± 0.00** | 3.79 ± 0.00 | 3.81 ± 0.00 |
| | 90 | 2.27 ± 0.00 | **2.14 ± 0.00** | 2.16 ± 0.00 |
| | 85 | **1.29 ± 0.00** | 1.31 ± 0.00 | 1.35 ± 0.00 |
| | 80 | **0.81 ± 0.00** | 0.84 ± 0.00 | 0.85 ± 0.00 |
| | 75 | **0.44 ± 0.00** | 0.57 ± 0.00 | 0.56 ± 0.00 |
| | 70 | **0.30 ± 0.00** | 0.41 ± 0.00 | 0.43 ± 0.00 |
| Imagenet100 | 100 | **13.49 ± 0.52** | **13.49 ± 0.52** | **13.49 ± 0.52** |
| | 90 | 8.42 ± 0.44 | 8.25 ± 0.43 | **8.11 ± 0.48** |
| | 80 | 5.21 ± 0.32 | 4.76 ± 0.37 | **4.52 ± 0.38** |
| | 70 | 3.30 ± 0.40 | 2.70 ± 0.21 | **2.58 ± 0.21** |
| | 60 | 2.14 ± 0.37 | 1.86 ± 0.32 | **1.71 ± 0.32** |
| | 50 | 1.55 ± 0.27 | 1.35 ± 0.25 | **1.31 ± 0.22** |
| | 40 | 1.23 ± 0.38 | 1.20 ± 0.11 | **1.07 ± 0.19** |
| | 30 | 1.09 ± 0.31 | 1.00 ± 0.19 | **0.96 ± 0.21** |
| | 20 | 1.03 ± 0.31 | 0.97 ± 0.21 | **0.90 ± 0.22** |
| | 10 | 0.80 ± 0.28 | 0.73 ± 0.25 | **0.53 ± 0.25** |

Comparison of Selection Mechanism Results.

For the CIFAR-10 results in Table 14, the difference in performance between the various selection mechanisms is again marginal. Due to the marginal difference between errors, it is difficult to draw conclusions from these results. For the Imagenet100 results in Table 14, it can be seen that selecting according to Softmax Response and entropy clearly outperforms the original selection mechanism.

Table 15 shows the results for Deep Gamblers (DG), Deep Gamblers plus entropy and Deep Gamblers plus Softmax Response (DG+SR) for the ImagenetSubset dataset:

TABLE 15

Deep Gamblers Results on ImagenetSubset (70% coverage) with various selective mechanisms.

| | | Deep Gamblers | | |
|---|---|---|---|---|
| Dataset | # of Classes | DG | DG + Entropy | DG + SR |
| ImagenetSubset | 175 | 3.77 ± 0.10 | 3.75 ± 0.14 | 3.62 ± 0.11 |
| | 150 | 2.62 ± 0.03 | 2.65 ± 0.26 | 2.54 ± 0.24 |
| | 125 | 2.58 ± 0.25 | 2.40 ± 0.19 | 2.22 ± 0.17 |
| | 100 | 2.57 ± 0.04 | 2.30 ± 0.01 | 2.20 ± 0.04 |
| | 75 | 2.60 ± 0.20 | 2.29 ± 0.00 | 2.22 ± 0.05 |
| | 50 | 2.63 ± 0.12 | 2.15 ± 0.05 | 2.08 ± 0.07 |
| | 25 | 1.60 ± 0.28 | 1.22 ± 0.30 | 1.30 ± 0.19 |

Similar to Imagenet100, there is a clear, substantial improvement when using Softmax Response as the selection mechanism instead of the original selection mechanism. Furthermore, entropy also outperforms the original selection mechanism.

Additional Standard Classifier Results

Additional experiments were performed using a standard or "vanilla" classifier, with selection according to entropy and Softmax Response. Table 16 shows the results for the CIFAR-10 dataset and Table 17 shows the results for the Imagenet100 dataset.

TABLE 16

Comparison of selection based on Entropy and Softmax Response for a vanilla classifier trained with cross-entropy loss on CIFAR-10.

| | | Vanilla Classifier | |
|---|---|---|---|
| Dataset | Coverage | Entropy | Softmax Response |
| CIFAR-10 | 100 | **6.61 ± 0.25** | **6.61 ± 0.25** |
| | 95 | 4.30 ± 0.19 | **4.35 ± 0.17** |
| | 90 | **2.63 ± 0.12** | **2.63 ± 0.11** |
| | 85 | 1.62 ± 0.10 | **1.63 ± 0.12** |
| | 80 | 1.01 ± 0.13 | **0.99 ± 0.10** |
| | 75 | **0.72 ± 0.08** | **0.72 ± 0.08** |
| | 70 | 0.57 ± 0.08 | **0.55 ± 0.07** |

In Table 16, the difference in performance between selecting according to entropy and selecting according to Softmax Response is not significant. This marginal difference is believed to be attributable to the saturatedness of the CIFAR-10 dataset.

TABLE 17

Comparison of selection based on Entropy and Softmax Response for a standard classifier trained with cross-entropy loss on Imagenet100.

| | | Vanilla Classifier | |
|---|---|---|---|
| Dataset | Coverage | Entropy | Softmax Response |
| Imagenet100 | 100 | **14.32 ± 0.14** | **14.32 ± 0.14** |
| | 90 | 9.14 ± 0.05 | **8.96 ± 0.13** |
| | 80 | 5.34 ± 0.12 | **4.99 ± 0.05** |
| | 70 | 3.04 ± 0.14 | **2.83 ± 0.12** |
| | 60 | 1.80 ± 0.14 | **1.70 ± 0.19** |
| | 50 | 1.22 ± 0.31 | **1.08 ± 0.28** |
| | 40 | 0.82 ± 0.32 | **0.77 ± 0.39** |
| | 30 | 0.63 ± 0.33 | **0.60 ± 0.28** |
| | 20 | 0.60 ± 0.28 | **0.60 ± 0.28** |
| | 10 | 0.30 ± 0.14 | **0.20 ± 0.28** |

In Table 17, it can be seen that selecting according to Softmax Response clearly outperforms selecting according to entropy.

As shown in Table 18 depicting performance on 100% coverage, Softmax Response learns a less generalizable classifier than Self-Adaptive Training, Deep Gamblers, and SelectiveNet:

TABLE 18

Results at 100% coverage on Imagenet100.

| Model | Accuracy |
|---|---|
| Vanilla Classifier | 85.68 ± 0.14 |
| SelectiveNet | 86.23 ± 0.14 |
| Deep Gamblers | 86.51 ± 0.52 |
| Self-Adaptive Training | 86.40 ± 0.30 |

Softmax Response outperforms both Deep Gamblers and SelectiveNet on low coverages (10%, 20%, 30%).

Further experiments show that the entropy-minimization and Softmax Response methodologies described herein are generalizable across architectures. Tables 19, 20 and 21 show results for the StanfordCars dataset for the ResNet34, RegNetX and ShuffleNet architectures, respectively, for each of Self-Adaptive Training (SAT), Self-Adaptive Training with Softmax Response (SAT+SR) and Self-Adaptive Training with entropy minimization in conjunction with the Softmax Response selection mechanism (SAT+EM+SR).

TABLE 19

ResNet34: StanfordCars results

| Coverage | ResNet34 SAT | ResNet34 SAT + SR | ResNet34 SAT + EM + SR |
|---|---|---|---|
| 100 | 37.68 ± 1.11 | 37.68 ± 1.11 | **32.49 ± 2.33** |
| 90 | 32.34 ± 1.19 | 32.04 ± 1.18 | **26.60 ± 2.39** |
| 80 | 26.86 ± 1.15 | 26.39 ± 1.13 | **20.87 ± 2.33** |
| 70 | 21.34 ± 1.20 | 20.70 ± 1.23 | **15.84 ± 1.98** |
| 60 | 16.21 ± 1.10 | 14.92 ± 1.03 | **11.09 ± 1.50** |
| 50 | 11.59 ± 0.74 | 10.25 ± 0.97 | **7.00 ± 1.13** |
| 40 | 7.76 ± 0.43 | 6.32 ± 0.69 | **4.00 ± 0.87** |
| 30 | 4.56 ± 0.35 | 3.54 ± 0.36 | **2.20 ± 0.44** |
| 20 | 2.42 ± 0.36 | 1.93 ± 0.09 | **1.17 ± 0.28** |
| 10 | 1.49 ± 0.00 | 1.20 ± 0.21 | **0.80 ± 0.22** |

TABLE 20

RegNetX: StanfordCars results

| Coverage | RegNetX SAT | RegNetX SAT + SR | RegNetX SAT + EM + SR |
|---|---|---|---|
| 100 | 31.78 ± 2.44 | 31.78 ± 2.44 | **27.75 ± 1.81** |
| 90 | 26.35 ± 2.43 | 25.68 ± 2.44 | **21.72 ± 1.90** |
| 80 | 21.20 ± 2.40 | 20.07 ± 2.54 | **16.21 ± 1.79** |
| 70 | 16.45 ± 2.14 | 14.77 ± 2.23 | **11.22 ± 1.54** |
| 60 | 12.13 ± 1.64 | 10.07 ± 1.58 | **7.39 ± 1.21** |
| 50 | 8.60 ± 1.27 | 6.43 ± 1.46 | **4.55 ± 0.96** |
| 40 | 5.94 ± 1.06 | 4.04 ± 0.88 | **2.88 ± 0.61** |
| 30 | 3.99 ± 0.60 | 2.47 ± 0.44 | **1.74 ± 0.34** |
| 20 | 2.55 ± 0.33 | 1.55 ± 0.00 | **1.10 ± 0.34** |
| 10 | 1.66 ± 0.26 | 0.91 ± 0.15 | **0.70 ± 0.26** |

TABLE 21

ShuffleNet: StanfordCars results

| Coverage | ShuffleNet SAT | ShuffleNet SAT + SR | ShuffleNet SAT + EM + SR |
|---|---|---|---|
| 100 | 34.10 ± 0.73 | 34.10 ± 0.73 | **32.90 ± 1.29** |
| 90 | 28.61 ± 0.72 | 28.27 ± 0.80 | **26.94 ± 1.33** |
| 80 | 23.16 ± 0.47 | 22.72 ± 0.63 | **21.13 ± 1.40** |
| 70 | 17.94 ± 0.27 | 17.14 ± 0.46 | **15.70 ± 1.42** |
| 60 | 13.00 ± 0.24 | 12.10 ± 0.46 | **10.89 ± 1.19** |
| 50 | 9.23 ± 0.10 | 7.68 ± 0.10 | **7.11 ± 0.87** |
| 40 | 6.31 ± 0.22 | 4.77 ± 0.24 | **4.49 ± 0.51** |
| 30 | 3.81 ± 0.39 | 2.97 ± 0.25 | **2.83 ± 0.28** |
| 20 | 2.07 ± 0.34 | 1.70 ± 0.30 | **1.43 ± 0.05** |
| 10 | 1.08 ± 0.26 | 0.99 ± 0.18 | **0.66 ± 0.31** |

Conclusion on Experiments

Reference is again made to Tables 1, 2 and 3, which compare the different selection mechanisms for a given selective classification method (SelectiveNet, Deep Gamblers, and Self-Adaptive Training). The results for Imagenet100 show that for each of these trained selective classifiers, their original selection mechanisms are suboptimal; in fact, selecting via either entropy or Softmax Response outperforms their original selection mechanism. These results suggest that (1) the strong performance of these methods were due to them learning a more generalizable model rather than their proposed external head/logit selection mechanisms and (2) the selection mechanism should stem from the classifier itself rather than a separate head/logit. Moreover, as can be seen in the above results, as between entropy minimization and Softmax Response, Softmax Response is the preferred selection mechanism. It is important to note that this performance gain is achieved by changing the selection mechanism of the pre-trained selective model without significant additional computational cost. This observation applies at least to SelectiveNet, Deep Gamblers and Self-Adaptive Training models.

The experiments show that applying either entropy minimization or Softmax Response alone provide gains. However, further improvement is achieved by the combination of both entropy minimization and Softmax Response. Table 9 shows that using only the entropy-minimization (SAT+EM) approach with Self-Adaptive Training slightly improves the performance as compared to Self-Adaptive Training alone. However, Self-Adaptive Training with entropy minimization in conjunction with the Softmax Response selection mechanism (SAT+EM+SR) improves upon both Self-Adaptive Training with Softmax Response (SAT+SR) and Self-Adaptive Training with entropy minimization (SAT+EM) significantly, achieving better results for selective classification. FIGS. 8A and 8B, 9A and 9B and 10A and 10B show risk coverage plots for Self-Adaptive Training (SAT), Self-Adaptive Training with Softmax Response (SAT+SR) and Self-Adaptive Training with entropy minimization in conjunction with the Softmax Response selection mechanism (SAT+EM+SR) for Imagenet100, Food101 and StanfordCars, respectively. All of these plots show that Self-Adaptive Training with entropy minimization in conjunction with the Softmax Response selection mechanism (SAT+EM+SR) outperforms Self-Adaptive Training (SAT) across all coverages.

Without being limited by theory, it is believed that the strong performance of prior art selective classifiers SelectiveNet, Deep Gamblers and Self-Adaptive Training results from learning a more generalizable classifier rather than the selection mechanism; it is a surprising and unexpected result that their suggested selection mechanisms are suboptimal and that selection mechanisms based on the classifier itself result in improved performance. Importantly, this method can be applied to an already deployed trained selective classification model and instantly improve performance at negligible cost. Moreover, entropy-minimization improves performance in selective classification. A selective classifier trained with the entropy-regularized loss and with selection according to Softmax Response achieves improved performance.

As can be seen from the above description, the selective classification technology described herein represents significantly more than merely using categories to organize, store and transmit information and organizing information through mathematical correlations. The selective classification technology is in fact an improvement to the technology of machine learning by improving the performance of selective classification models. Moreover, the selective classification technology is confined to the selective classification context within the field of machine learning.

Illustrative Technical Environments for Implementation

The present technology may be embodied within a system, a method, a computer program product or any combination thereof. The computer program product may include a computer readable storage medium or media having computer readable program instructions thereon for causing a processor to carry out aspects of the present technology. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language or a conventional procedural programming language. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to implement aspects of the present technology.

Aspects of the present technology have been described above with reference to flowchart illustrations and/or block diagrams of methods, apparatus (systems) and computer program products according to various embodiments. In this regard, the flowchart and block diagrams in the Figures illustrate the architecture, functionality, and operation of possible implementations of systems, methods and computer program products according to various embodiments of the present technology. For instance, each block in the flowchart or block diagrams may represent a module, segment, or portion of instructions, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Some specific examples of the foregoing may have been noted above but any such noted examples are not necessarily the only such examples. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, other programmable data processing apparatus, or other devices to function in a particular manner, such that the instructions stored in the computer readable storage medium produce an article of manufacture including instructions which implement aspects of the functions/acts specified in the flowchart and/or block diagram block or blocks. The computer readable program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
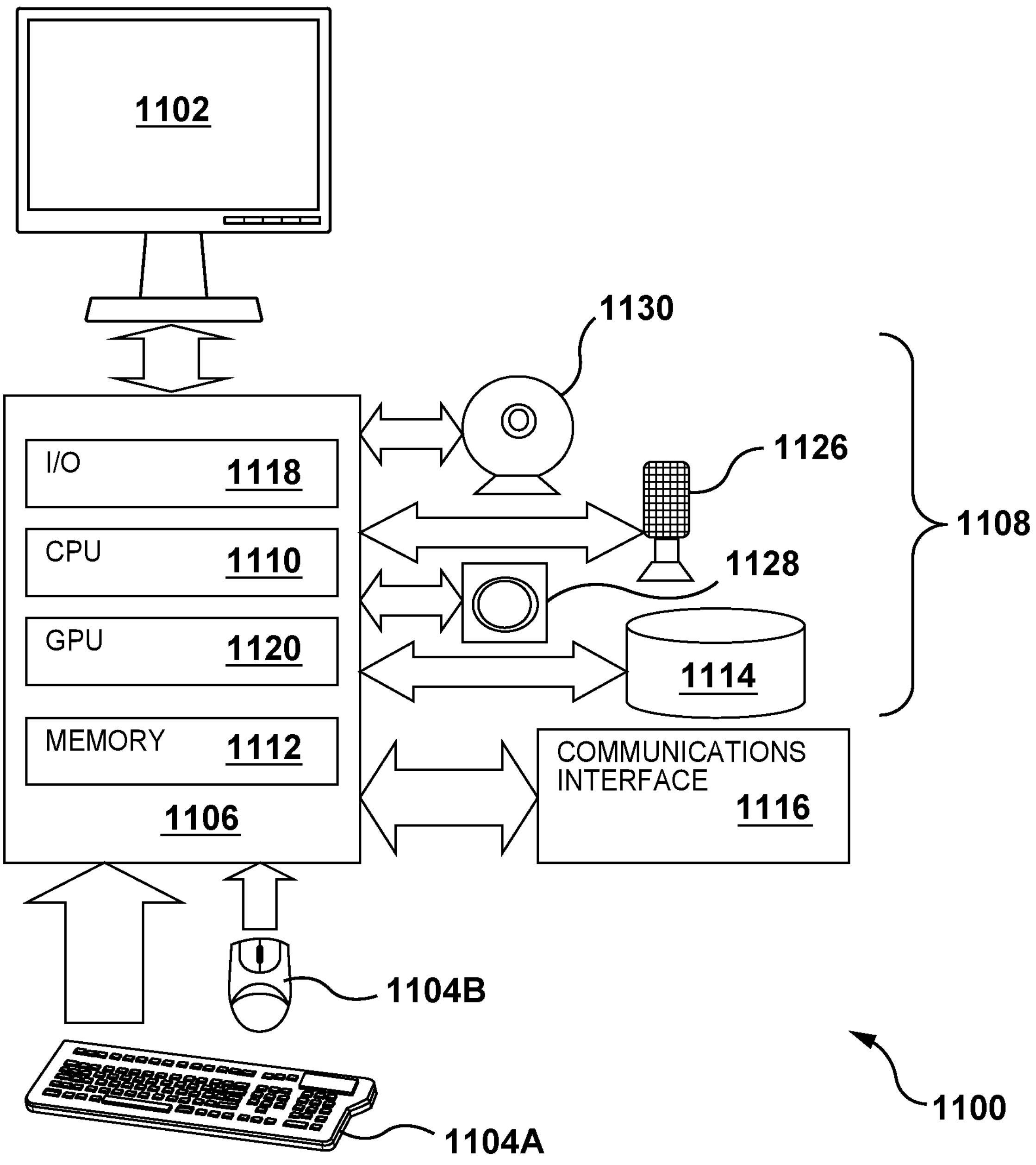
FIG. 11 is a block diagram showing an illustrative computer system in respect of which aspects of the present technology may be implemented.

An illustrative computer system in respect of which the technology herein described may be implemented is presented as a block diagram in FIG. 11. The illustrative computer system is denoted generally by reference numeral 1100 and includes a display 1102, input devices in the form of keyboard 1104A and pointing device 1104B, computer 1106 and external devices 1108. While pointing device 1104B is depicted as a mouse, it will be appreciated that other types of pointing device, or a touch screen, may also be used.

The computer 1106 may contain one or more processors or microprocessors, such as a central processing unit (CPU) 1110. The CPU 1110 performs arithmetic calculations and control functions to execute software stored in an internal memory 1112, preferably random access memory (RAM) and/or read only memory (ROM), and possibly additional memory 1114. The additional memory 1114 may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 1114 may be physically internal to the computer 1106, or external as shown in FIG. 11, or both.

The computer system 1100 may also include other similar means for allowing computer programs or other instructions to be loaded. Such means can include, for example, a communications interface 1116, which allows software and data to be transferred between the computer system 1100 and external systems and networks. Examples of communications interface 1116 can include a modem, a network interface such as an Ethernet card, a wireless communication interface, or a serial or parallel communications port. Software and data transferred via communications interface 1116 are in the form of signals which can be electronic, acoustic, electromagnetic, optical or other signals capable of being received by communications interface 1116. Multiple interfaces, of course, can be provided on a single computer system 1100.

Input and output to and from the computer 1106 is administered by the input/output (I/O) interface 1118. This I/O interface 1118 administers control of the display 1102, keyboard 1104A, external devices 1108 and other such components of the computer system 1100. The computer 1106 also includes a graphical processing unit (GPU) 1120. The latter may also be used for computational purposes as an adjunct to, or instead of, the (CPU) 1110, for mathematical calculations.

The external devices 1108 include a microphone 1126, a speaker 1128 and a camera 1130. Although shown as external devices, they may alternatively be built in as part of the hardware of the computer system 1100.

The various components of the computer system 1100 are coupled to one another either directly or by coupling to suitable buses.

The terms "computer system", "data processing apparatus" and related terms, as used herein, are not limited to any particular type of computer system and encompasses servers, desktop computers, laptop computers, networked mobile wireless telecommunication computing devices such as smartphones, tablet computers, as well as other types of computer systems.

Thus, computer readable program code for implementing aspects of the technology described herein may be contained or stored in the memory 1112 of the computer 1106, or on a computer usable or computer readable medium external to the computer 1106, or on any combination thereof.

Finally, the terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the form disclosed. Many modifications and variations will be apparent to those of ordinary skill in the art without departing from the scope of the claims. The embodiment was chosen and described in order to best explain the principles of the technology and the practical application, and to enable others of ordinary skill in the art to understand the technology for various embodiments with various modifications as are suited to the particular use contemplated.

One or more currently preferred embodiments have been described by way of example. It will be apparent to persons skilled in the art that a number of variations and modifications can be made without departing from the scope of the claims. In construing the claims, it is to be understood that the use of a computer to implement the embodiments described herein is essential.

Appendix: ImagenetSubset

ImagenetSubset comprises of multiple datasets ranging from 25 to 175 classes in increments of 25, i.e. $\{D_{25}, D_{50}, D_{75}, D_{125}, D_{150}, D_{175}\}$. Let $C_{25}, C_{50}, \ldots, C_{175}$ represent the classes of the respective datasets. The classes for ImagenetSubset are uniform randomly sampled from the classes of Imagenet such that the classes of the smaller datasets are subsets of the classes of the larger datasets, i.e. $D_{25} \subset D_{50} \subset D_{75} \subset \ldots \subset D_{175}$ and $C_{25} \subset C_{50} \ldots C_{175}$. The list of Imagenet classes in each subset included below for reproducibility.

| C25 | | | | | | | |
|---|---|---|---|---|---|---|---|
| n03133878 | n03983396 | n03995372 | n03776460 | n02730930 | n03814639 | n03666591 | n03110669 |
| n04442312 | n02017213 | n04265275 | n01774750 | n03709823 | n09256479 | n07715103 | n04560804 |
| n02120505 | n04522168 | n04074963 | n02268443 | n03291819 | n02091467 | n02486261 | n03180011 |
| n02100236 | | | | | | | |

| C50-C25 | | | | | | | |
|---|---|---|---|---|---|---|---|
| n02106662 | n01871265 | n12057211 | n04579432 | n07734744 | n02408429 | n02025239 | n03649909 |
| n03041632 | n02484975 | n02097209 | n03854065 | n03476684 | n04579145 | n01739381 | n02319095 |
| n01843383 | n02229544 | n09288635 | n02138441 | n02119022 | n07583066 | n03534580 | n02817516 |
| n04356056 | | | | | | | |

-continued

| | | | | | | | |
|---|---|---|---|---|---|---|---|
| C75-C50 | | | | | | | |
| n03424325 | n04507155 | n02112350 | n03450230 | n01616318 | n01641577 | n03630383 | n01530575 |
| n02102973 | n04310018 | n02134084 | n01729322 | n03250847 | n02099849 | n03544143 | n03871628 |
| n03777754 | n04465501 | n01770081 | n03255030 | n01910747 | n03016953 | n03485407 | n03998194 |
| n02129604 | | | | | | | |
| C100-C75 | | | | | | | |
| n02128757 | n03763968 | n01677366 | n03483316 | n02177972 | n03814906 | n01753488 | n02116738 |
| n01755581 | n02264363 | n03290653 | n13133613 | n03929660 | n04040759 | n02317335 | n02494079 |
| n02865351 | n03134739 | n02102177 | n04192698 | n02814533 | n04090263 | n01818515 | n01748264 |
| n04328186 | | | | | | | |
| C125-C100 | | | | | | | |
| n03930313 | n02422106 | n07714571 | n02111277 | n03706229 | n03729826 | n03344393 | n07831146 |
| n02090379 | n06596364 | n03187595 | n04317175 | n11939491 | n04277352 | n01807496 | n02804610 |
| n02093991 | n09428293 | n03207941 | n02132136 | n04548280 | n02793495 | n03924679 | n02112137 |
| n02107312 | | | | | | | |
| C150-C125 | | | | | | | |
| n03376595 | n03467068 | n02837789 | n04467665 | n04243546 | n03530642 | n04398044 | n02113624 |
| n13044778 | n03188531 | n01729977 | n01980166 | n02101388 | n01629819 | n01773157 | n01689811 |
| n02109525 | n03938244 | n02123045 | n04548362 | n04612504 | n04264628 | n02108551 | n04311174 |
| n02276258 | | | | | | | |
| C175-C150 | | | | | | | |
| n03724870 | n02087046 | n09421951 | n02799071 | n07717410 | n02906734 | n02206856 | n03877472 |
| n01740131 | n04523525 | n03496892 | n04116512 | n03743016 | n03759954 | n04462240 | n03788195 |
| n02137549 | n03866082 | n02233338 | n02219486 | n02445715 | n02974003 | n01924916 | n12620546 |
| n02992211 | | | | | | | |

List of References

None of the documents cited herein is admitted to be prior art. The following list of references, each of which is incorporated by reference in its entirety, is provided without prejudice for convenience only, and without admission that any of the references listed herein is citable as prior art.

[1] Robert Baldock, Hartmut Maennel, and Behnam Neyshabur. Deep learning through the lens of example difficulty. *Advances in Neural Information Processing Systems,* 34, 2021.

[2] Peter L. Bartlett and Marten H. Wegkamp. Classification with a reject option using a hinge loss. *J. Mach. Learn. Res.,* 9:0 1823-1840, Jun 2008. ISSN 1532-4435.

[3] Lukas Bossard, Matthieu Guillaumin, and Luc Van Gool. Food-101—mining discriminative components with random forests. In *European Conference on Computer Vision,* 2014.

[4] Nontawat Charoenphakdee, Zhenghang Cui, Yivan Zhang, and Masashi Sugiyama. Classification with rejection based on cost-sensitive classification. In *International Conference on Machine Learning*, pp. 1507-1517. PMLR, 2021.

[5] C. Chow. On optimum recognition error and reject tradeoff. *IEEE Transactions on Information Theory,* 160 (1):0 41-46, 1970. doi: 10.1 109fTT.1970.1054406.

[6] Corinna Cortes, Giulia DeSalvo, and Mehryar Mohri. Boosting with abstention. *Advances in Neural Information Processing Systems,* 29, 2016.

[7] Jia Deng, Wei Dong, Richard Socher, Li-Jia Li, Kai Li, and Li Fei-Fei. Imagenet: A large-scale hierarchical image database. In 2009 *IEEE conference on computer vision and pattern recognition*, pp. 248-255. IEEE, 2009.

[8] Thomas G Dietterich and Alex Guyer. The familiarity hypothesis: Explaining the behavior of deep open set methods. *Pattern Recognition,* 132:0 108931, 2022.

[9] Michael Dusenberry, Ghassen Jerfel, Yeming Wen, Yian Ma, Jasper Snoek, Katherine Heller, Balaji Lakshminarayanan, and Dustin Tran. Efficient and scalable Bayesian neural nets with rank-1 factors. In International Conference on Machine Learning, 2020.

[10] Peter I. Frazier. A tutorial on bayesian optimization. *arXiv preprint arXiv:* 1807.02811, 2018.

[11] Giorgio Fumera and Fabio Roli. Support vector machines with embedded reject option. In *International Workshop on Support Vector Machines*, pp. 68-82. Springer, 2002.

[12] Yarin Gal and Zoubin Ghahramani. Dropout as a Bayesian approximation: Representing model uncertainty in deep learning. In *International Conference on Machine Learning,* 2016.

[13] Yonatan Geifman and Ran El-Yaniv. Selective classification for deep neural networks. *Advances in neural information processing systems,* 30, 2017.

[14] Yonatan Geifman and Ran El-Yaniv. SelectiveNet: A deep neural network with an integrated reject option. In *International Conference on Machine Learning*, pp. 2151-2159. PMLR, 2019.

[15] Yves Grandvalet and Yoshua Bengio. Semi-supervised learning by entropy minimization. *Advances in neural information processing systems,* 17, 2004.

[16] Chuan Guo, Geoff Pleiss, Yu Sun, and Kilian Q Weinberger. On calibration of modern neural networks. In *International Conference on Machine Learning*, pp. 1321-1330. PMLR, 2017.

[17] Martin E. Hellman. The nearest neighbor classification rule with a reject option. *IEEE Trans. Syst. Sci. Cybern.,* 6:0 179-185, 1970.

[18] Dan Hendrycks and Kevin Gimpel. A baseline for detecting misclassified and out-of-distribution examples in neural networks. *arXiv preprint arXiv:* 1610.02136, 2016.

[19] Alex Holub, Pietro Perona, and Michael C. Burl. Entropy-based active learning for object recognition. In 2008 *IEEE Computer Society Conference on Computer Vision and Pattern Recognition Workshops*, pages 1-8, 2008.

[20] Lang Huang, Chao Zhang, and Hongyang Zhang. Self-adaptive training: beyond empirical risk minimization. *Advances in neural information processing systems,* 33:0 19365-19376, 2020.

[21] Lang Huang, Chao Zhang, and Hongyang Zhang. Self-adaptive training: Bridging supervised and self-supervised learning. *IEEE Transactions on Pattern Analysis and Machine Intelligence*, pp. 1-17, 2022. doi: 10.1 109/TPAMI. 2022.3217792.

[22] Erik Jones, Shiori Sagawa, Pang Wei Koh, Ananya Kumar, and Percy Liang. Selective classification can magnify disparities across groups. In International Conference on Learning Representations, 2021. URL: https://openreview.net/forum?id=N0M_4BkQ05i.

[23] Jonathan Krause, Michael Stark, Jia Deng, and Li Fei-Fei. 3d object representations for fine-grained categorization. In 4*th International IEEE Workshop on* 3D *Representation and Recognition* (3dRR-13), Sydney, Australia, 2013.

[24] Alex Krizhevsky. Learning multiple layers of features from tiny images. 2009.

[25] Balaji Lakshminarayanan, Alexander Pritzel, and Charles Blundell. Simple and scalable predictive uncertainty estimation using deep ensembles. In Advances in Neural Information Processing Systems, 2017.

[26] Yann LeCun, Bernhard Boser, John Denker, Donnie Henderson, Richard Howard, Wayne Hubbard, and Lawrence Jackel. Handwritten digit recognition with a back-propagation network. *Advances in neural information processing systems,* 2, 1989.

[27] Joshua K Lee, Yuheng Bu, Deepta Rajan, Prasanna Sattigeri, Rameswar Panda, Subhro Das, and Gregory W. Wornell. Fair selective classification via sufficiency. In Marina Meila and Tong Zhang (eds.), International Conference on Machine Learning, volume 139 of Proceedings of Machine Learning Research, pp. 6076-6086. PMLR, 18-24 Jul. 2021.

[28] Mingsheng Long, Han Zhu, Jianmin Wang, and Michael I Jordan. Unsupervised domain adaptation with residual transfer networks. *Advances in neural information processing systems,* 29, 2016.

[29] Wesley J Maddox, Pavel Izmailov, Timur Garipov, Dmitry P. Vetrov, and Andrew Gordon Wilson. A simple baseline for bayesian uncertainty in deep learning. *Advances in Neural Information Processing Systems,* 2019.

[30] Matthias Minderer, Josip Djolonga, Rob Romijnders, Frances Hubis, Xiaohua Zhai, Neil Houlsby, Dustin Tran, and Mario Lucic. Revisiting the calibration of modern neural networks. *Advances in Neural Information Processing Systems,* 34, 2021.

[31] Hussein Mozannar and David Sontag. Consistent estimators for learning to defer to an expert. In *International Conference on Machine Learning*, pp. 7076-7087. PMLR, 2020.

[32] Pengzhen Ren, Yun Xiao, Xiaojun Chang, Po-Yao Huang, Zhihui Li, Brij B. Gupta, Xiaojiang Chen, and Xin Wang. A survey of deep active learning. *ACM Computing Surveys* (*CSUR*), 54(9):1-40, 2021.

[33] Olga Russakovsky, Jia Deng, Hao Su, Jonathan Krause, Sanjeev Satheesh, Sean Ma, Zhiheng Huang, Andrej Karpathy, Aditya Khosla, Michael Bernstein, et al. Imagenet large scale visual recognition challenge. *International journal of computer vision,* 115(3):211-252, 2015.

[34] Yonglong Tian, Dilip Krishnan, and Phillip Isola. Contrastive multiview coding. *In European conference on computer vision*, pp. 776-794. Springer, 2020.

[35] Tuan-Hung Vu, Himalaya Jain, Maxime Bucher, Matthieu Cord, and Patrick Pérez. Advent: Adversarial entropy minimization for domain adaptation in semantic segmentation. In *Proceedings of the IEEF/CVF Conference on Computer Vision and Pattern Recognition*, pp. 2517-2526, 2019.

[36] Marten Wegkamp and Ming Yuan. Support vector machines with a reject option. *Bernoulli,* 170 (4):0 1368-1385, 2011.

[37] Marten Wegkamp. Lasso type classifiers with a reject option. *Electronic Journal of Statistics,* 1:0 155-168, 2007.

[38] Xiaofu Wu, Quan Zhou, Zhen Yang, Chunming Zhao, Longin Jan Latecki, et al. Entropy minimization vs. diversity maximization for domain adaptation. *arXiv preprint arXiv:* 2002.01690, 2020.

[39] Liu Ziyin, Zhikang T Wang, Paul Pu Liang, Ruslan Salakhutdinov, Louis-Philippe Morency, and Masahito Ueda. Deep gamblers: learning to abstain with portfolio theory. In *Proceedings of the* 33*rd International Conference on Neural Information Processing Systems*, pages 10623-10633, 2019.

What is claimed is:

1. A method for modifying a trained selective classifier, the method comprising:

for the trained selective classifier, having an existing trained selection mechanism, modifying the trained selective classifier to obtain a modified trained selective classifier wherein:

the modified trained selective classifier disregards the existing trained selection mechanism; and the modified trained selective classifier uses, as a basis for an alternate selection mechanism, at least one classification prediction value;

wherein the modified trained selective classifier preserves training of the trained selective classifier.

2. The method of claim 1, further comprising, before modifying the trained selective classifier:

commencing with an untrained selective classifier;

training the untrained selective classifier with a modified loss function to obtain the trained selective classifier;

wherein the modified loss function has at least one added term, relative to an original loss function, wherein the at least one added term decreases entropy.

3. The method of claim 1, further comprising, before modifying the trained selective classifier:

commencing with an untrained selective classifier; and training the untrained selective classifier with an original loss function for the selective classifier to obtain the trained selective classifier.

4. The method of claim 1, wherein the method uses, as the basis for the alternate selection mechanism, one of (i) predictive entropy for classification or (ii) maximum predictive class logit.

5. The method of claim 1, further comprising, before modifying the trained selective classifier:

receiving the trained selective classifier.

6. The method of claim 1, wherein:

the trained selective classifier is a SelectiveNet network;

the existing trained selection mechanism is a selection head.

7. The method of claim 1, wherein:

the existing trained selection mechanism uses a value of an abstention logit; and the alternate selection mechanism ignores the abstention logit.

8. The method of claim 7, wherein the trained selective classifier is one of (i) a Self-Adaptive Training network or (ii) a Deep Gamblers network.

9. A data processing system comprising at least one processor and memory coupled to the processor, wherein the memory contains instructions which, when implemented by the at least one processor, cause the at least one processor to implement a method for modifying a trained selective classifier, the method comprising:

for the trained selective classifier, having an existing trained selection mechanism, modifying the trained selective classifier to obtain a modified trained selective classifier wherein:

the modified trained selective classifier disregards the existing trained selection mechanism; and the modified trained selective classifier uses, as a basis for an alternate selection mechanism, at least one classification prediction value;

wherein the modified trained selective classifier preserves training of the trained selective classifier.

10. The data processing system of claim 9, wherein the method further comprises, before modifying the trained selective classifier:

commencing with an untrained selective classifier;

training the untrained selective classifier with a modified loss function to obtain the trained selective classifier;

wherein the modified loss function has at least one added term, relative to an original loss function, wherein the at least one added term decreases entropy.

11. The data processing system of claim 9, further comprising, before modifying the trained selective classifier:

commencing with an untrained selective classifier; and training the untrained selective classifier with an original loss function for the selective classifier to obtain the trained selective classifier.

12. The data processing system of claim 9, wherein the method uses, as the basis for the alternate selection mechanism, one of (i) predictive entropy for classification or (ii) maximum predictive class logit.

13. The data processing system of claim 9, wherein:

the trained selective classifier is a SelectiveNet network;

the existing trained selection mechanism is a selection head.

14. The data processing system of claim 9, wherein:

the existing trained selection mechanism uses a value of an abstention logit; and the alternate selection mechanism ignores the abstention logit.

15. The method of claim 14, wherein the trained selective classifier is one of (i) a Self-Adaptive Training network or (ii) a Deep Gamblers network.

16. A computer program product comprising tangible non-transitory computer-readable media containing instructions which, when executed by at least one processor of a computer, cause the computer to implement a method for modifying a trained selective classifier, the method comprising:

for the trained selective classifier, having an existing trained selection mechanism, modifying the trained selective classifier to obtain a modified trained selective classifier wherein:

the modified trained selective classifier disregards the existing trained selection mechanism; and the modified trained selective classifier uses, as a basis for an alternate selection mechanism, at least one classification prediction value;

wherein the modified trained selective classifier preserves training of the trained selective classifier.

17. The computer program product of claim 16, wherein the method further comprises, before modifying the trained selective classifier:

commencing with an untrained selective classifier;

training the untrained selective classifier with a modified loss function to obtain the trained selective classifier;

wherein the modified loss function has at least one added term, relative to an original loss function, wherein the at least one added term decreases entropy.

18. The computer program product of claim 16, further comprising, before modifying the trained selective classifier:

commencing with an untrained selective classifier; and training the untrained selective classifier with an original loss function for the selective classifier to obtain the trained selective classifier.

19. The computer program product of claim 16, wherein the method uses, as the basis for the alternate selection mechanism, one of (i) predictive entropy for classification or (ii) maximum predictive class logit.

20. The computer program product of claim 16, wherein:

the trained selective classifier is a SelectiveNet network;

the existing trained selection mechanism is a selection head.

21. The computer program product of claim 16, wherein:

the existing trained selection mechanism uses a value of an abstention logit; and the alternate selection mechanism ignores the abstention logit.

22. The computer program product of claim 21, wherein the trained selective classifier is one of (i) a Self-Adaptive Training network or (ii) a Deep Gamblers network.

* * * * *